(12) United States Patent
Ueno et al.

(10) Patent No.: US 8,786,518 B2
(45) Date of Patent: Jul. 22, 2014

(54) DISPLAY DEVICE

(75) Inventors: Yasuhiro Ueno, Yokohama (JP); Shigeki Tanabe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 141 days.

(21) Appl. No.: 13/593,815

(22) Filed: Aug. 24, 2012

(65) Prior Publication Data

US 2013/0050061 A1 Feb. 28, 2013

(30) Foreign Application Priority Data

Aug. 29, 2011 (JP) ................. 2011-186646

(51) Int. Cl.
*G09G 5/00* (2006.01)
(52) U.S. Cl.
USPC ........................................... 345/1.3; 345/173
(58) Field of Classification Search
CPC ..... G06F 1/1647; G06F 3/147; G06F 3/0346; G06F 3/04815; G06F 3/04842
USPC ................ 345/1.3, 6, 156, 173, 419
See application file for complete search history.

(56) References Cited

U.S. PATENT DOCUMENTS

| | | | | |
|---|---|---|---|---|
| 8,631,339 B2* | 1/2014 | Kim | ................. | 345/1.3 |
| 2005/0156813 A1* | 7/2005 | Adachi et al. | ................. | 345/1.3 |
| 2010/0245369 A1* | 9/2010 | Yoshino | .................. | 345/1.3 |
| 2011/0032252 A1* | 2/2011 | Ohta | ................. | 345/419 |
| 2013/0278499 A1* | 10/2013 | Anderson | .................. | 345/156 |

FOREIGN PATENT DOCUMENTS

JP 2011095547 A 5/2011

* cited by examiner

*Primary Examiner* — Regina Liang
(74) *Attorney, Agent, or Firm* — Lowe Hauptman & Ham, LLP

(57) ABSTRACT

According to an aspect, a display device includes a first display unit, a second display unit, a first detecting unit, a second detecting unit, and a control unit. The first display unit three-dimensionally displays a first display object in a first space. The second display unit three-dimensionally displays a second display object associated with the first display object in a second space. The first detecting unit detects a move of a first object in the first space. The second detecting unit detects a move of a second object in the second space. The control unit changes the first display object and the second display object according to a first move of the first object in the first space.

19 Claims, 31 Drawing Sheets

FIG.13

| TYPE | | FUL-CRUM | OBSTACLE | PUSHED SPEED | CHANGE |
|---|---|---|---|---|---|
| RIGID BODY | NOT EXIST | | NOT PRESENT | * | IT IS MOVED IN THE PUSHED DIRECTION ACCORDING TO A PUSHED AMOUNT. |
| | | | FIXED OBSTACLE | * | IT IS MOVED IN THE PUSHED DIRECTION ACCORDING TO A PUSHED AMOUNT. IT IS NOT MOVED AFTER COMING IN CONTACT WITH THE OBSTACLE. |
| | | | OTHER RIGID BODY | LOW | IT IS MOVED IN THE PUSHED DIRECTION ACCORDING TO A PUSHED AMOUNT. AFTER COMING IN CONTACT WITH OTHER RIGID BODY, IT IS MOVED TOGETHER WITH THE OTHER RIGID BODY. |
| | | | | HIGH | IT IS MOVED IN THE PUSHED DIRECTION ACCORDING TO A PUSHED AMOUNT. ON CONTACT WITH OTHER RIGID BODY, IT FLICKS AWAY THE OTHER RIGID BODY. |
| | | | OTHER RIGID BODY (WHICH CAN BE PASSED THROUGH) | * | IT IS MOVED IN THE PUSHED DIRECTION ACCORDING TO A PUSHED AMOUNT. ON CONTACT WITH OTHER RIGID BODY, IT IS MOVED SO AS TO PASS THROUGH THE OTHER RIGID BODY. |
| | EXIST | | NOT PRESENT | * | IT IS ROTATED AROUND THE FULCRUM. |

FIG.14

| TYPE | MATERIAL | CHANGE AMOUNT | PUSHED SPEED | CHANGE |
|---|---|---|---|---|
| ELASTIC BODY | RUBBER-BASED | WITHOUT LIMITATION | LOW | IT IS DEFORMED IN THE PUSHED DIRECTION ACCORDING TO A PUSHED AMOUNT. WHEN RELEASED, IT RETURNS TO ITS ORIGINAL SHAPE. |
| | | WITH LIMITATION | HIGH | IT IS DEFORMED IN THE PUSHED DIRECTION ACCORDING TO A PUSHED AMOUNT. THEN, IT IS MOVED WHILE RETURNING TO ITS ORIGINAL SHAPE. |
| | | WITH LIMITATION | * | IT IS DEFORMED IN THE PUSHED DIRECTION UP TO A CHANGEABLE RANGE ACCORDING TO A PUSHED AMOUNT. THEN, IT IS MOVED WHILE RETURNING TO ITS ORIGINAL SHAPE. |
| | METAL-BASED | WITH LIMITATION | * | WHEN IT IS PUSHED IN A DEFORMABLE DIRECTION, IT IS DEFORMED IN THE PUSHED DIRECTION UP TO A CHANGEABLE RANGE ACCORDING TO A PUSHED AMOUNT. WHEN RELEASED, RETURNING TO ITS ORIGINAL SHAPE AND DEFORMATION ARE REPEATED (VIBRATED). WHEN IT IS PUSHED IN ANY DIRECTION OTHER THAN THE DEFORMABLE DIRECTION, IT IS MOVED SIMILARLY TO THE RIGID BODY. |

FIG.15

| TYPE | CHANGE |
|---|---|
| PLASTIC BODY | ENTIRE SHAPE IS DEFORMED SO THAT THE PUSHED PORTION DENTS. |

FIG.16

| TYPE | PUSHED SPEED | CHANGE |
|---|---|---|
| LIQUID | LOW | OBJECT IS SOAKED IN LIQUID. |
| | MEDIUM | OBJECT IS SOAKED IN LIQUID. RIPPLES SPREAD ACROSS THE LIQUID. |
| | HIGH | OBJECT IS SOAKED IN LIQUID. WATER SPLASHES. |

FIG.17

| TYPE | PUSHED SPEED | CHANGE |
|---|---|---|
| GAS | LOW | IT IS BLOCKED BY THE OBJECT (TO FLOAT AROUND THE OBJECT). |
| | MEDIUM | IT IS SCATTERED. |
| | HIGH | EDDY IS PRODUCED DUE TO TURBULENT FLOW AT THE REAR SIDE OF THE OBJECT IN THE MOVING DIRECTION. |

FIG.18

| TYPE | COMBINATION OF ELEMENTS | CHANGE |
|---|---|---|
| AGGREGATION | NOT COMBINED | ENTIRE SHAPE AS AN AGGREGATION IS DEFORMED SO THAT THE PUSHED PORTION DENTS. |
| | COMBINED | ENTIRE SHAPE AS AN AGGREGATION IS DEFORMED SO THAT THE PUSHED PORTION DENTS. ELEMENTS OTHER THAN THE PUSHED PORTION ARE PULLED BY THE ELEMENT AT THE PUSHED PORTION AND ARE MOVED. |
| | NOT COMBINED (THERE IS ATTRACTIVE FORCE OR REPULSIVE FORCE BETWEEN THE ELEMENTS AND THE OBJECT) | WHEN THERE IS ATTRACTIVE FORCE, THE ELEMENTS WITHIN A PREDETERMINED DISTANCE TO THE OBJECT ARE ATTRACTED TO THE OBJECT WITHOUT IN CONTACT WITH THE OBJECT. WHEN THERE IS REPULSIVE FORCE, THE ELEMENTS WITHIN A PREDETERMINED DISTANCE TO THE OBJECT ARE REPELLED FROM THE OBJECT WITHOUT IN CONTACT WITH THE OBJECT. |

DISPLAY DEVICE

CROSS-REFERENCE TO RELATED APPLICATIONS

This application claims priority from Japanese Application No. 2011-186646, filed on Aug. 29, 2011, the content of which is incorporated by reference herein in its entirety.

BACKGROUND

1. Field of the Invention

The present disclosure relates to a display device.

2. Description of the Related Art

Some display devices with a display unit such as mobile phones can three-dimensionally display an image and so on (see e.g., Japanese Patent Application Laid-open No. 2011-95547). The three-dimensional display is implemented by using binocular disparity.

The three-dimensional display is a user-friendly display manner; however, it has been used just for viewing purposes, and has not been used for improving the convenience of operations.

For the foregoing reasons, there is a need for a display device that can provide the user with convenient operations using the three-dimensional display.

SUMMARY

According to an aspect, a display device includes a first display unit, a second display unit, a first detecting unit, a second detecting unit, and a control unit. The first display unit three-dimensionally displays a first display object in a first space. The second display unit three-dimensionally displays a second display object associated with the first display object in a second space. The first detecting unit detects a move of a first object in the first space. The second detecting unit detects a move of a second object in the second space. The control unit changes the first display object and the second display object according to a first move of the first object in the first space.

According to another aspect, a display device includes a first display unit, a second display unit, a first detecting unit, a second detecting unit, and a control unit. The first display unit three-dimensionally displays a first display object in a first space. The second display unit three-dimensionally displays a second display object associated with the first display object in a second space. The first detecting unit detects a move of a first object in the first space. The second detecting unit detects a move of a second object in the second space. The control unit for changing the first display object and the second display object according to a first move of the first object in the first space. The first display unit and the second display unit are configured such that an angle therebetween can be changed substantially from 0° to 360°.

BRIEF DESCRIPTION OF THE DRAWINGS

FIG. 13 is a diagram of an example of information stored in action data;

FIG. 14 is a diagram of another example of the information stored in the action data;

FIG. 15 is a diagram of still another example of the information stored in the action data;

FIG. 16 is a diagram of still another example of the information stored in the action data;

FIG. 17 is a diagram of still another example of the information stored in the action data;

FIG. 18 is a diagram of still another example of the information stored in the action data;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
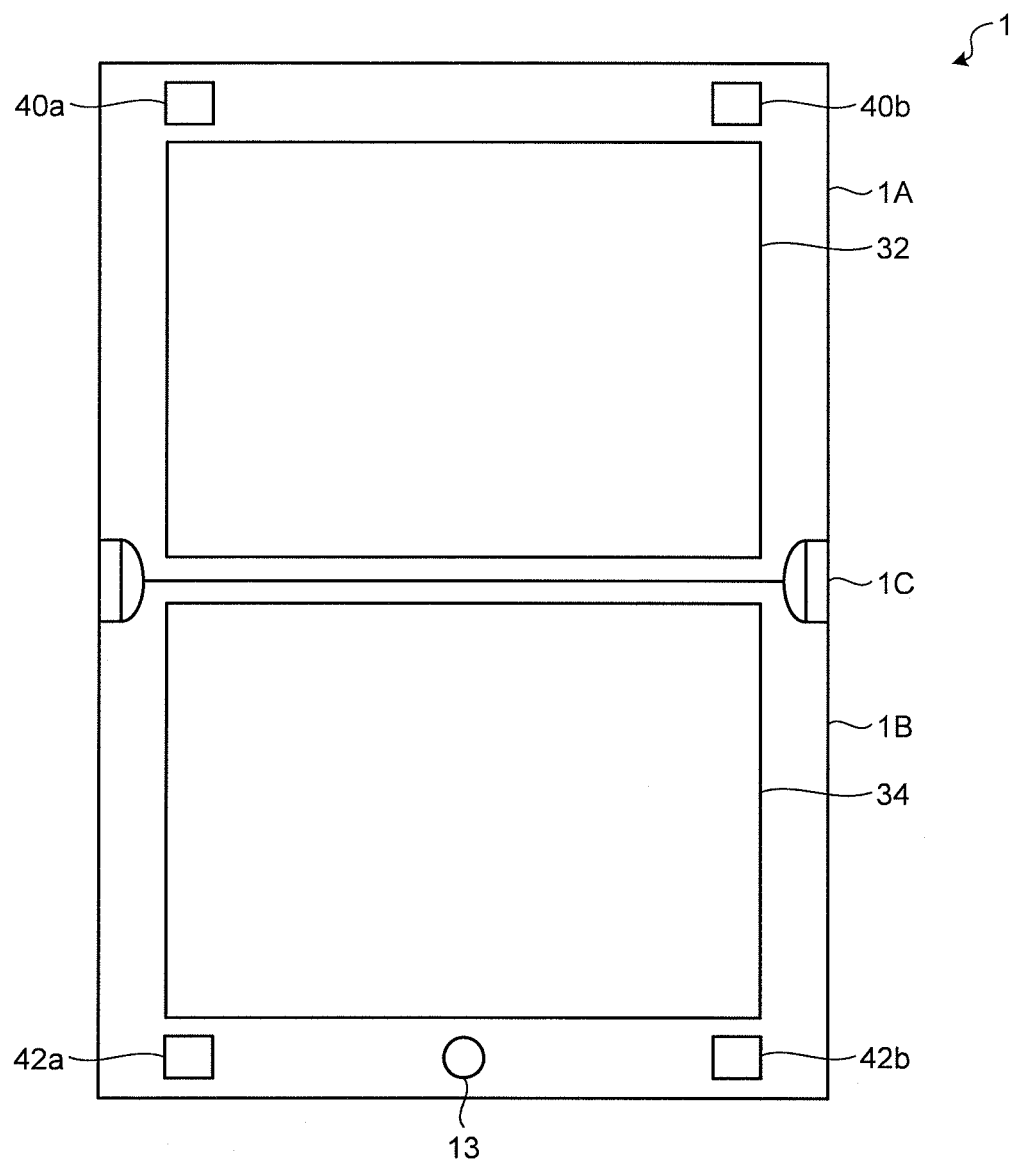
FIG. 1 is a front view of a mobile phone according to a first embodiment.
Figure 2:
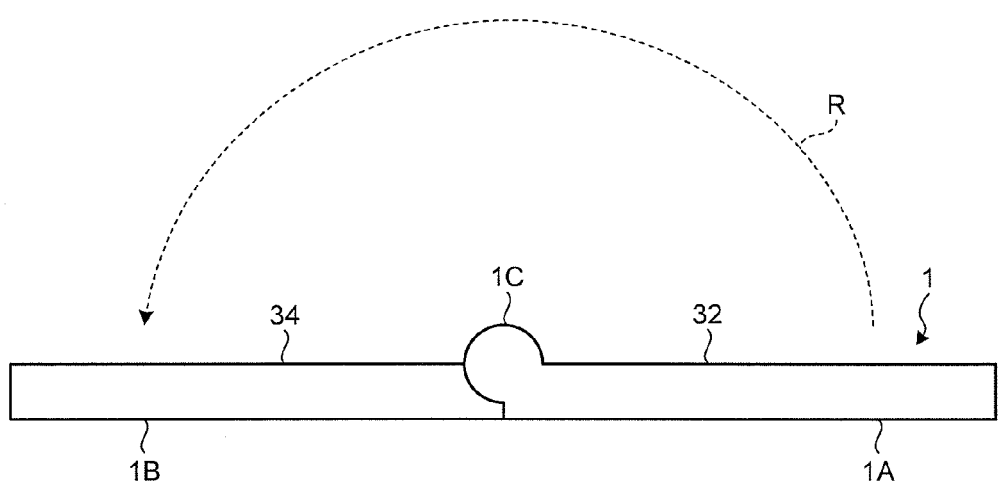
FIG. 2 is a side view of the mobile phone in its open state.
Figure 3:
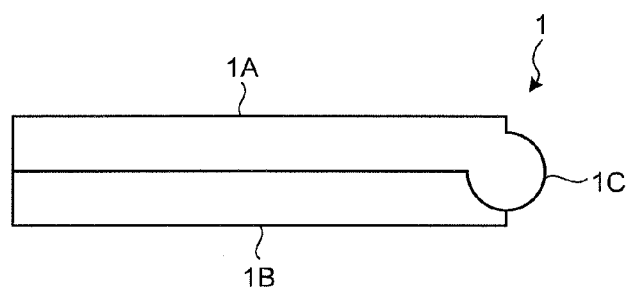
FIG. 3 is a side view of the mobile phone in its closed state.

First of all, the configuration of a mobile phone (display device) 1 according to a first embodiment will be explained below with reference to FIG. 1 to FIG. 3. FIG. 1 is a front view of the mobile phone 1. FIG. 2 is a side view of the mobile phone 1 in its open state. FIG. 3 is a side view of the mobile phone 1 in its closed state.

As illustrated in FIG. 1 to FIG. 3, the mobile phone 1 includes a first housing 1A, a second housing 1B, and a hinge 1C. The first housing 1A includes a touch panel 32, an imaging unit 40a, and an imaging unit 40b on one of its faces. The second housing 1B includes a touch panel 34, an imaging unit 42a, and an imaging unit 42b on one of its faces. The hinge 1C relatively pivotably connects the first housing 1A and the second housing 1B.

In the open state illustrated in FIG. 1 and FIG. 2, the touch panel 32 provided in the first housing 1A and the touch panel 34 provided in the second housing 1B form a substantially continuous flat plane. The mobile phone 1 is deformed from the open state illustrated in FIG. 1 and FIG. 2 to the closed state illustrated in FIG. 3 by pivoting the first housing 1A along an R direction around the hinge 1C by about 180 degrees. The closed state makes the touch panel 32 and the touch panel 34 invisible from the outside.

The closed state is a form suitable for the user to carry the mobile phone 1. The open state is a form suitable for the user to hold the mobile phone 1 and use it. The mobile phone 1 may be used even in an intermediate state between the open state and the closed state, for example, even in a state in which the first housing 1A is substantially vertical with respect to the second housing 1B.

Figure 4:
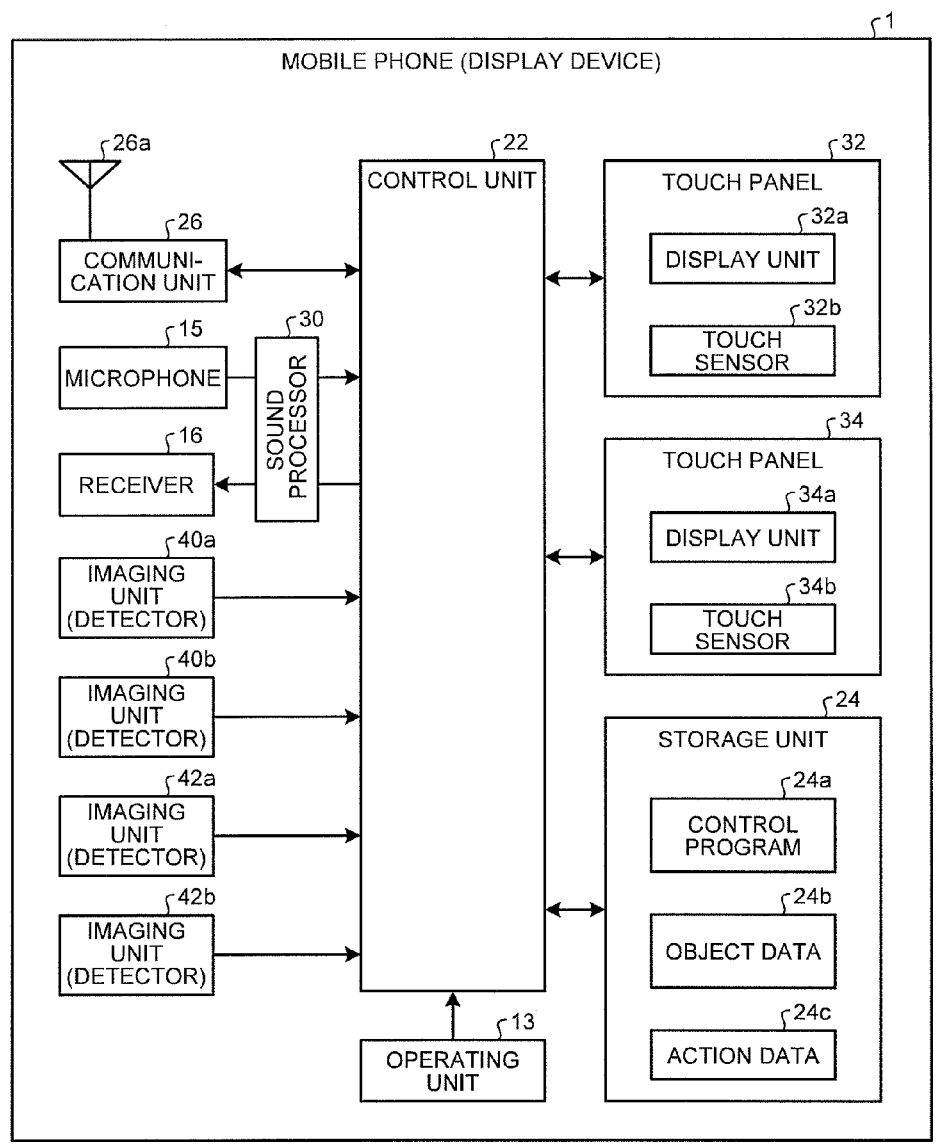
FIG. 4 is a block diagram of the mobile phone according to the first embodiment.

Then a functional configuration of the mobile phone 1 will be explained below with reference to FIG. 4. FIG. 4 is a block diagram of the mobile phone 1. As illustrated in FIG. 4, the mobile phone 1 includes an operating unit 13, a microphone 15, a receiver 16, a control unit 22, a storage unit 24, a communication unit 26, a sound processor 30, the touch panel 32, the touch panel 34, the imaging unit 40a, the imaging unit 40b, the imaging unit 42a, and the imaging unit 42b.

The operating unit 13 has physical buttons, and outputs a signal corresponding to a pressed button to the control unit 22. In the example illustrated in FIG. 1, the operating unit 13 has only one button, however, may have a plurality of buttons. Moreover, in the example illustrated in FIG. 1, the operating unit 13 is provided on a face where the touch panel 34 of the second housing 1B is provided; however, the operating unit 13 may be provided on any face of both of the housings.

The microphone 15 acquires an external sound. The receiver 16 outputs voice of the other party on the phone. The sound processor 30 converts the sound input from the microphone 15 to a digital signal and outputs the converted signal to the control unit 22. The sound processor 30 decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 and the touch panel 34 display various pieces of information such as text, graphics, and images, and detect contact(s) of object(s). The touch panel 32 includes a display unit 32a and a touch sensor 32b which overlap each other. The touch panel 34 includes a display unit 34a and a touch sensor 34b which overlap each other.

Each of the display unit 32a and the display unit 34a is provided with a display device such as a liquid crystal display (LCD) or an organic electro-luminescence display (GELD), and displays various pieces of information according to a control signal input from the control unit 22. The touch sensor 32b and the touch sensor 34b detect contact(s) the surface of the touch panel 32 and the surface of the touch panel 34 respectively, and output a signal corresponding to the detected contact(s) to the control unit 22; thereby, the control unit 22 determines (detects) an input operation performed for the touch panel 32 and the touch panel 34. The detection method for contact(s) by the touch sensor 32b and the touch sensor 34b may be any detection methods, including but not limited to, a capacitive type detection method, a resistive type detection method, and a pressure sensitive type detection method.

The touch panel 32 and the touch panel 34 can display a three-dimensional object. The three-dimensional object is a display object such as an image and a shape created so as to look as if it is three-dimensional using disparity. The touch panel 32 and the touch panel 34 can display the three-dimensional object as if it jumps out of the touch panel 32 and the touch panel 34 toward the front. The touch panel 32 and the touch panel 34 can also display the three-dimensional object as if it is in a more backward space than the touch panel 32 and the touch panel 34. The method of displaying the three-dimensional object may be a method of realizing stereovision using a tool such as glasses, or may be a method of realizing stereovision with the naked eye.

A three-dimensional object displayed on the touch panel 32 may be associated with a three-dimensional object displayed on the touch panel 34. As an example of the association, the three-dimensional object displayed on the touch panel 32 and the three-dimensional object displayed on the touch panel 34 may be controlled so as to be displayed as a one continuous three-dimensional object. When the three-dimensional object is displayed across the touch panel 32 and the touch panel 34, the touch panel 32 and the touch panel 34 share the three-dimensional object and display shared portions to be displayed respectively.

As another example of the association, a three-dimensional object displayed on the touch panel 32 and a three-dimensional object displayed on the touch panel 34 may be controlled so as to be changed together with each other. For example, when a three-dimensional object displayed on the touch panel 32 is to be changed, any other three-dimensional object displayed on the touch panel 34 may be changed together with the three-dimensional object.

Each of the imaging units 40a, 40b, 42a, and 42b electronically captures an image using an image sensor such as a charge-coupled device (CCD) image sensor or a complementary metal oxide semiconductor (CMOS) image sensor. Each of the imaging units 40a, 40b, 42a, and 42b converts a captured image to a signal and outputs the converted signal to the control unit 22. The imaging units 40a, 40b, 42a, and 42b each function as a detector that detects object(s) for selecting and operating a three-dimensional object in a space in which the three-dimensional object is stereoscopically displayed (hereinafter, "visual space" or "three-dimensional space").

The imaging unit 40a and the imaging unit 40b capture an object located mainly in a three-dimensional space on the first housing 1A side. The imaging unit 42a and the imaging unit 42b capture an object located mainly in a three-dimensional space on the second housing 1B side. The imaging units 40a, 40b, 42a, and 42b may be configured to set a field angle and layout so that, even if an object such as a finger is located in any part of the three-dimensional spaces, the object can be captured by at least one of the imaging units. The imaging units 40a, 40b, 42a, and 42b may be a device that captures an image of visible light or may be a device that captures an image of invisible light such as infrared rays. In the following explanation, the imaging units 40a and 40b may be called "imaging unit 40" without being specific to either one of them. The imaging units 42a and 42b may be called "imaging unit 42" without being specific to either one of them.

The control unit 22 includes a central processing unit (CPU) being a processing unit and a memory being a storage unit, and implements various functions by executing programs using these hardware resources. Specifically, the control unit 22 loads a program or data stored in the storage unit 24 to the memory, and causes the CPU to execute instructions contained in the program loaded to the memory. The control unit 22 performs read/write of data from/to the memory and the storage unit 24 and controls operations of the communication unit 26, the display unit 32a, and the like according to the execution result of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the program stored in the storage unit 24 include a control program 24a. Examples of the data stored in the storage unit 24 include object data 24b and action data 24c. The storage unit 24 may include a combination of a portable storage medium such as a memory card and a reader/writer for reading/writing data from/to the storage medium. In this case, the control program 24a, the object data 24b, and the action data 24c may be stored in the storage medium. In addition, the control program 24a, the object data 24b, and the action data 24c may be acquired from any other device such as a server through wireless communication by the communication unit 26.

The control program 24a provides a function related to various controls for operating the mobile phone 1. Examples of the function provided by the control program 24a include a function for controlling a display of a three-dimensional object by the touch panel 32 and a function for detecting a user's operation performed for the three-dimensional object displayed through the touch panel 32.

The object data 24b includes information for shapes and characteristics of a three-dimensional object. The object data 24b is used to display the three-dimensional object. The action data 24c includes information for how an operation performed for a displayed three-dimensional object acts on the three-dimensional object. When the operation performed for the displayed three-dimensional is detected, the action data 24c is used to change the three-dimensional object. Examples of the change mentioned here include, but are not limited to, movement, rotation, deformation, and deletion.

Figures 5, 6:
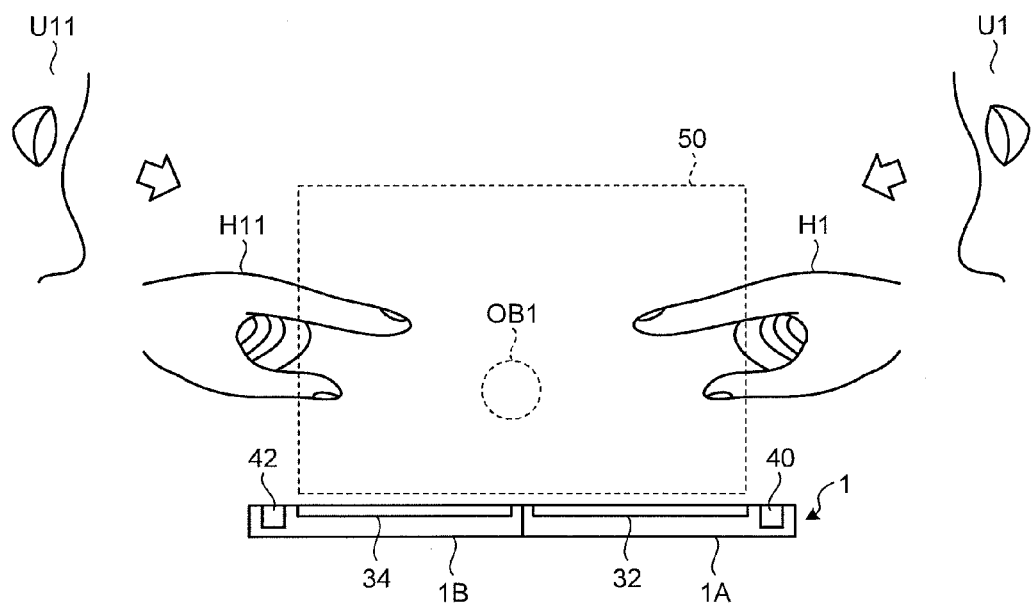
FIG. 5 is a diagram for explaining a display of a three-dimensional object and an operation performed for the three-dimensional object.
FIG. 6 is a diagram of an example of information stored in object data.

Then a display of a three-dimensional object and an operation performed for the three-dimensional object will be explained with reference to FIG. 5 and FIG. 6. FIG. 5 is a diagram for explaining a display of a three-dimensional object and an operation performed for the three-dimensional object. FIG. 6 is a diagram of an example of information stored in the object data 24b.

As illustrated in FIG. 5, a three-dimensional space 50, in which the touch panel 32 and the touch panel 34 can stereoscopically display a three-dimensional object, is formed across the first housing 1A and the second housing 1B in their open state. In the example of FIG. 5, a three-dimensional object OB1 appears near the boundary between the first housing 1A and the second housing 1B in their open state. The three-dimensional object OB1 includes two three-dimensional objects associated with each other, that is, includes a first object displayed by the touch panel 32 and a second object displayed by the touch panel 34.

The three-dimensional object OB1 is displayed based on the object data 24b. As illustrated in FIG. 6, the object data 24b stores therein information, including but not limited to, type, shape information, color, and transparency for each three-dimensional object. The type indicates physical characteristics of each three-dimensional object. The type is represented by a value such as "rigid body" and "elastic body". The shape information indicates a shape of each three-dimensional object. The shape information is, for example, a set of vertex coordinates of faces forming the three-dimensional object. The color is a surface color of each three-dimensional object. The transparency is a degree in which each three-dimensional object transmits light. The object data 24b can hold information for a plurality of three-dimensional objects.

In the example of FIG. 5, a user U1 on the first housing 1A side moves a hand H1 into the three-dimensional space 50 and is about to operate the three-dimensional object OB1 with the hand H1. The mobile phone 1 detects a position and an operation of an object such as the hand H1 in the three-dimensional space on the first housing 1A side based on an image captured by the imaging unit 40. When it is determined, based on the detection result, that an operation has been performed for the three-dimensional object OB1 with the object such as the hand H1, the mobile phone 1 changes the three-dimensional object OB1 according to the operation. In this case, the mobile phone 1 changes the first object displayed by the touch panel 32 and the second object displayed by the touch panel 34 in association with each other, to thereby change the three-dimensional object OB1.

Moreover, in the example of FIG. 5, a user U1f on the second housing 1B side moves a hand H11 into the three-dimensional space 50 and is about to operate the three-dimensional object OB1 with the hand H11. The mobile phone 1 detects a position and an operation of an object such as the hand H11 in the three-dimensional space on the second housing 1B side based on an image captured by the imaging unit 42. When it is determined, based on the detection result, that an operation has been performed for the three-dimensional object OB1 with the object such as the hand H11, the mobile phone 1 changes the three-dimensional object OB1 according to the operation. In this case, the mobile phone 1 changes the first object displayed by the touch panel 32 and the second object displayed by the touch panel 34 in association with each other, to thereby change the three-dimensional object OB1.

In this way, the mobile phone 1 detects the operations performed for the three-dimensional object displayed in the three-dimensional space 50 separately on the first housing 1A side and the second housing 1B side. Therefore, when the mobile phone 1 changes the three-dimensional object OB1 according to the detected operations, the operation detected on the first housing 1A side may conflict with the operation detected on the second housing 1B side. The conflict may occur, for example, when operations associated with each other performed for three-dimensional object are detected on both the first housing 1A side and the second housing 1B side in a short time.

The mobile phone 1 resolves the conflict based on times at which the operations are detected. As a rule, when the conflict occurs, the mobile phone 1 validates an operation detected earlier, and ignores the other operation detected later. However, when a difference between the detected times is smaller than a threshold, the mobile phone 1 ignores both of the detected operations. That is, when the difference between the detected times is smaller than the threshold, the mobile phone 1 does not change the three-dimensional object OB1 according to the operations.

The threshold used here is set based on, for example, a period of time required for determining whether an action of the user's hand or so is an operation performed for the three-dimensional object. The time required for determining whether it is the operation performed for the three-dimensional object varies according to how the action of the user's hand or so is complicated. When the difference between the detected times is smaller than the threshold, both operations are ignored, thus reducing the possibility that an operation executed later is erroneously validated.

Figure 7:
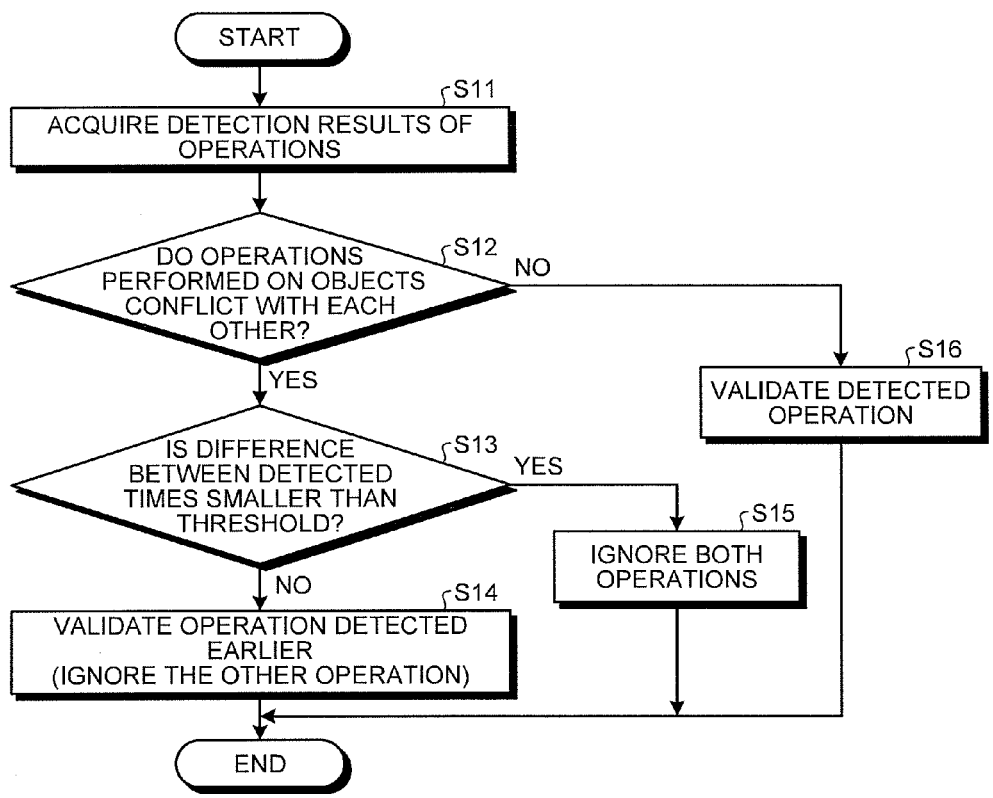
FIG. 7 is a flowchart of a procedure for determining validity of an operation.

Then a procedure for determining the validity of an operation will be explained with reference to FIG. 7. FIG. 7 is a flowchart of a procedure for determining the validity of an operation. The procedure illustrated in FIG. 7 is implemented by the control unit 22 executing the control program 24a triggered by, for example, detection of the operation based on an image captured by at least one of the imaging unit 40 and the imaging unit 42.

As illustrated in FIG. 7, at Step S11, the control unit 22 acquires detection results of operations. Then at Step S12, the control unit 22 determines whether the operations performed for the object conflict with each other. When the operations conflict with each other (Yes at Step S12), then at Step S13, the control unit 22 determines whether the difference between the detected times of the conflicting operations is smaller than the threshold.

When the difference between the detected times is not smaller than the threshold (No at Step S13), then at Step S14, the control unit 22 validates the operation detected earlier than the other. In this case, the operation detected later is ignored. When the difference between the detected times is smaller than the threshold (Yes at Step S13), then at Step S15, the control unit 22 ignores both of the operations.

When the operations do not conflict with each other (No at Step S12), then Step S16, the control unit 22 validates the detected operation.

Figure 8:
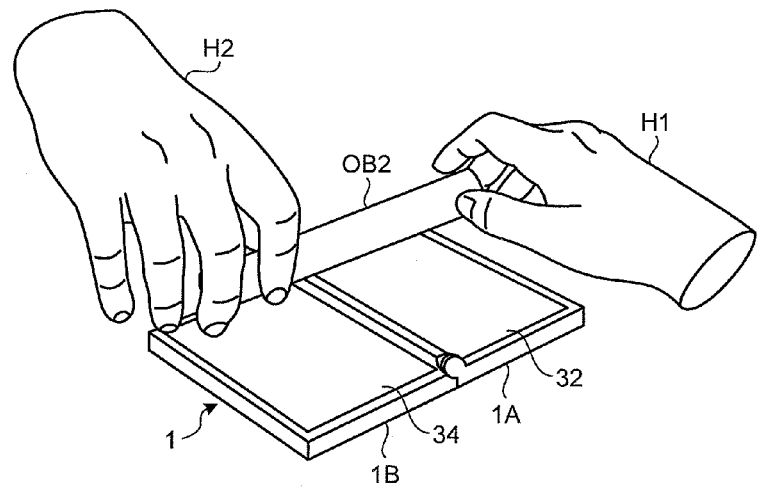
FIG. 8 is a diagram illustrating an example of a "fight over stick" game.

Then example applications for determination of the validity of the operations will be explained below with reference to FIG. 8 to FIG. 10. FIG. 8 is a diagram illustrating an example of a "fight over stick" game. In the fight over stick game, the mobile phone 1 causes the touch panel 32 and the touch panel 34 to display a stick-like three-dimensional object OB2. One end of the three-dimensional object OB2 appears in the three-dimensional space on the first housing 1A side, and the other end appears in the three-dimensional space on the second housing 1B side.

The fight over stick game is played by a first player on the first housing 1A side and a second player on the second housing 1B side. Both of the players wait for the display of the three-dimensional object OB2, and try grasping the displayed three-dimensional object OB2 more quickly than the other. The mobile phone 1 detects an operation of grasping the three-dimensional object OB2 with the hand H1 of the first player in the three-dimensional space on the first housing 1A side based on an image captured by the imaging unit 40. The mobile phone 1 also detects an operation of grasping the three-dimensional object OB2 with a hand H2 of the second player in the three-dimensional space on the second housing 1B side based on an image captured by the imaging unit 42.

When a difference between the times, at which the operation of grasping the three-dimensional object OB2 with the hand H1 and the operation of grasping the three-dimensional object OB2 with the hand H2 are detected, is smaller than the threshold, the mobile phone 1 determines that both of the operations are invalid. In this case, the three-dimensional object OB2 is deleted, and the two players again wait for the display of the three-dimensional object OB2. Meanwhile, when the difference between the detected times is not smaller than the threshold, the mobile phone 1 determines the player who first grasps the three-dimensional object OB2 as a winner.

Figure 9:
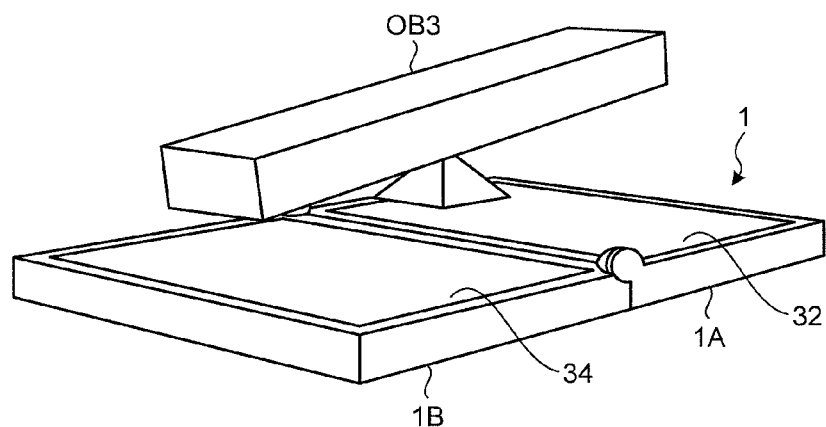
FIG. 9 is a diagram illustrating an example of a seesaw game.

FIG. 9 is a diagram illustrating an example of a seesaw game. In the seesaw game, the mobile phone 1 causes the touch panel 32 and the touch panel 34 to display a seesaw-shaped three-dimensional object OB3. One end of a movable portion of the three-dimensional object OB3 appears in the three-dimensional space on the first housing 1A side, and the other end appears in the three-dimensional space on the second housing 1B side.

The seesaw game is designed so as to alternately perform an operation of pushing down the end of the movable portion of the three-dimensional object OB3 on the first housing 1A side and an operation of pushing down the end thereof on the second housing 1B side. The mobile phone 1 displays the three-dimensional object OB3 so that an end pushed down lowers and the other end is lifted according to the respective operations. The operation of pushing down the end on the first housing 1A side and the operation of pushing down the end on the second housing 1B side are performed at appropriate intervals, so that the ends of the three-dimensional object OB3 rhythmically repeat the up-and-down movement.

The mobile phone 1 detects an operation of pushing down the end in the three-dimensional space on the first housing 1A side based on an image captured by the imaging unit 40. The mobile phone 1 also detects an operation of pushing down the end in the three-dimensional space on the second housing 1B side based on an image captured by the imaging unit 42. When a difference between the times, at which the operation of pushing down the end in the three-dimensional space on the first housing 1A side and the operation of pushing down the end in the three-dimensional space on the second housing 1B side are detected, is smaller than the threshold, the mobile phone 1 determines that both of the operations are invalid. In this case, the mobile phone 1 stops the move of the three-dimensional object OB3.

In the seesaw game, the operations of pushing down the two ends of the movable portion of the three-dimensional object OB3 may be performed by one person, or the ends may be pushed down by different persons. The mobile phone 1 may add up a point according to the length of a time during which the up-and-down movement of the ends of the three-dimensional object OB3 continues, or may add up a point according to the number of times at which the ends of the three-dimensional object OB3 go up and down in a predetermined time.

Figure 10:
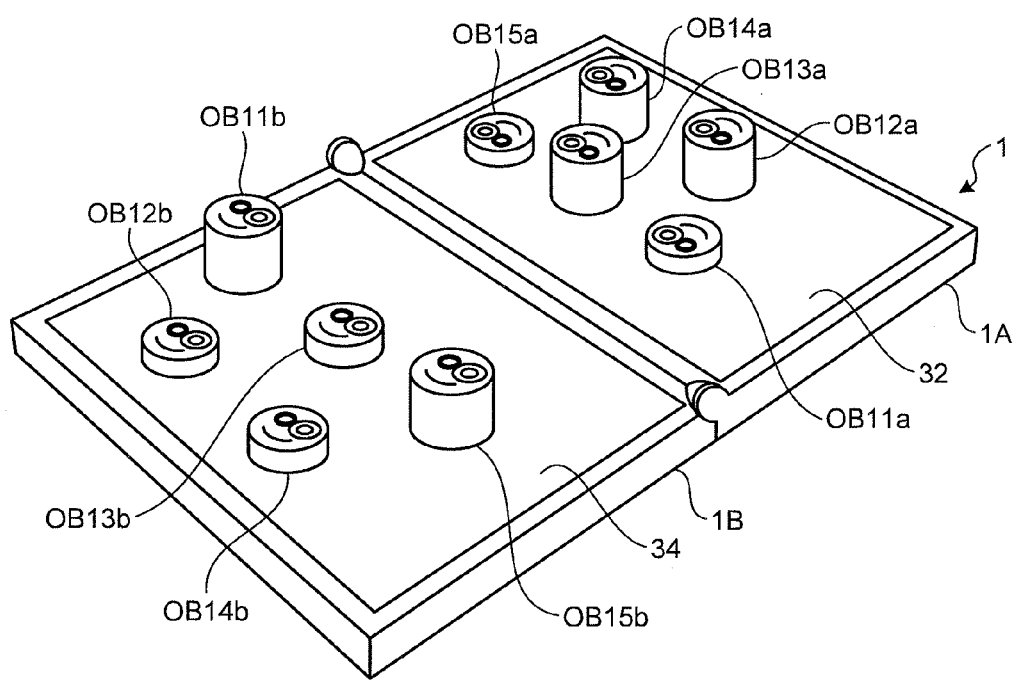
FIG. 10 is a diagram illustrating an example of a whack-a-mole game.

FIG. 10 is a diagram illustrating an example of a whack-a-mole game. In the whack-a-mole game, the mobile phone 1 causes the touch panel 32 and the touch panel 34 to display a plurality of three-dimensional objects associated with each other. A three-dimensional object OB11a displayed on the touch panel 32 is associated with a three-dimensional object OB11b displayed on the touch panel 34. Likewise, three-dimensional objects OB12a, OB13a, OB14a, and OB15a which are displayed on the touch panel 32 are associated with three-dimensional objects OB12b, OB13b, OB4, and OB15b which are displayed on the touch panel 34, respectively.

When detecting an operation of pushing down one of the associated three-dimensional objects, the mobile phone 1 lowers the height of the pushed-down three-dimensional object and lifts the height of the other three-dimensional object. Based on the association between the three-dimensional objects in this manner, in the whack-a-mole game, a first player on the first housing 1A side and a second player on the second housing 1B side play so that the three-dimensional objects on each own side become low.

The mobile phone 1 detects an operation of pushing down a three-dimensional object in the three-dimensional space on the first housing 1A side based on an image captured by the imaging unit 40. The mobile phone 1 also detects an operation of pushing down a three-dimensional object in the three-dimensional space on the second housing 1B side based on an image captured by the imaging unit 42.

When a difference between the times, at which the operation of pushing down the three-dimensional object in the three-dimensional space on the first housing 1A side and the operation of pushing down the three-dimensional object in the three-dimensional space on the second housing 1B side are detected, is smaller than a threshold, the mobile phone 1 determines that both of the operations are invalid. In this case, the height of one of the three-dimensional objects is maintained low and the height of the other three-dimensional object is maintained high. In other words, one of the players performs the operation of pushing down the three-dimensional object which has been already low at appropriate timing, which enables to prevent the other player from lowering the height of the corresponding three-dimensional object.

In the whack-a-mole game, the mobile phone 1 may add up times, during which each height of the three-dimensional objects is low, separately on the first housing 1A side and the second housing 1B side, and thereby determine a winner. The mobile phone 1 may also determine a player, as a winner, who makes low the heights of all the three-dimensional objects on his/her own side.

Then detection of an operation performed for a three-dimensional object and a change of the three-dimensional object according to the detected operation will be explained. Although a case where an operation is detected on the first housing 1A side will be explained below, an operation on the second housing 1B side is also similarly detected. When the operation detected on the first housing 1A side and the operation detected on the second housing 1B side conflict with each other, the validity of the operations is determined as explained above. When the three-dimensional object is changed according to the operation detected on the first housing 1A side, the mobile phone 1 may change the three-dimensional object together with the other three-dimensional object associated therewith.

Figure 11:
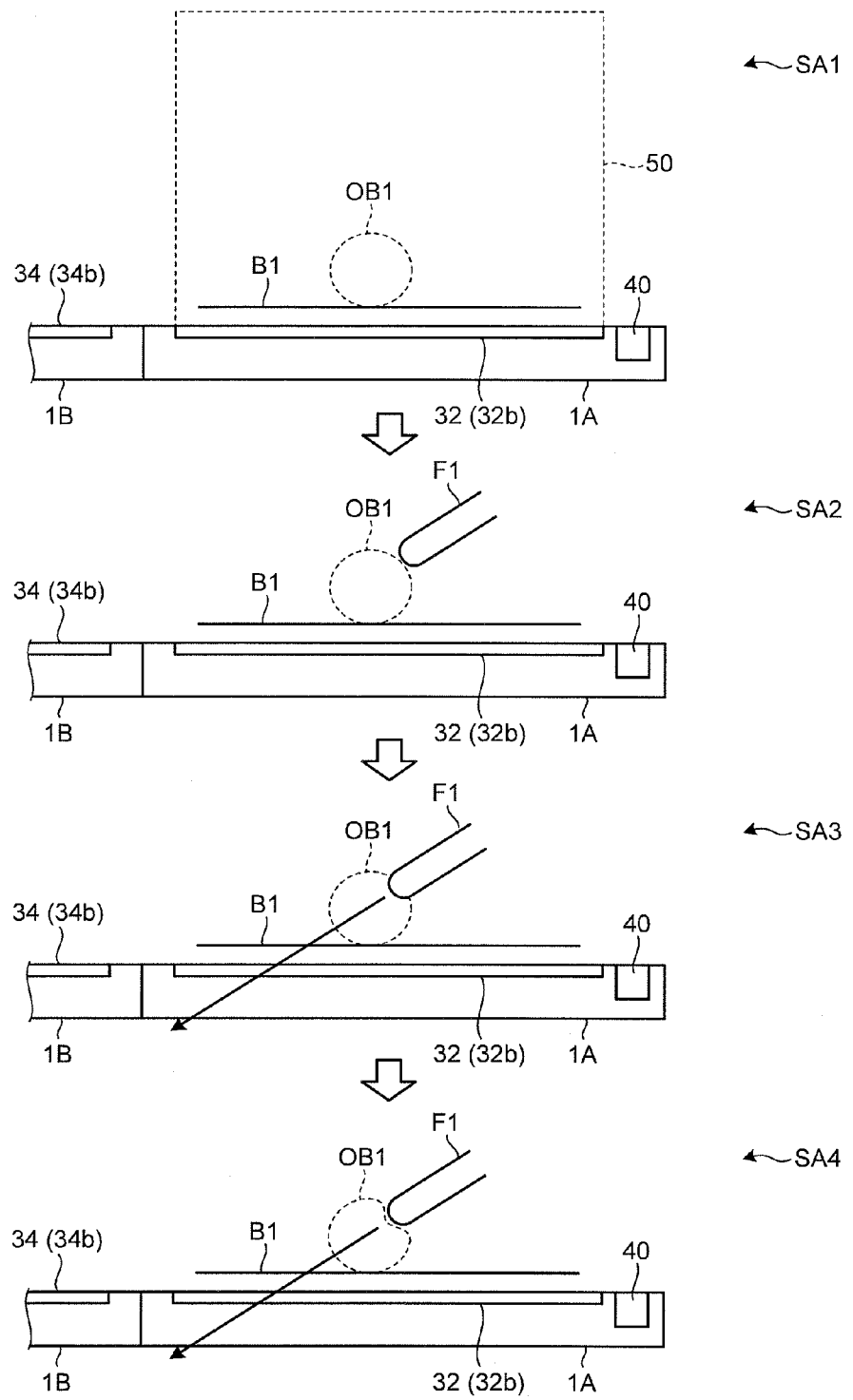
FIG. 11 is a diagram for explaining detection of an operation of pushing a three-dimensional object and a change of the three-dimensional object according to the detected operation.
Figure 12:
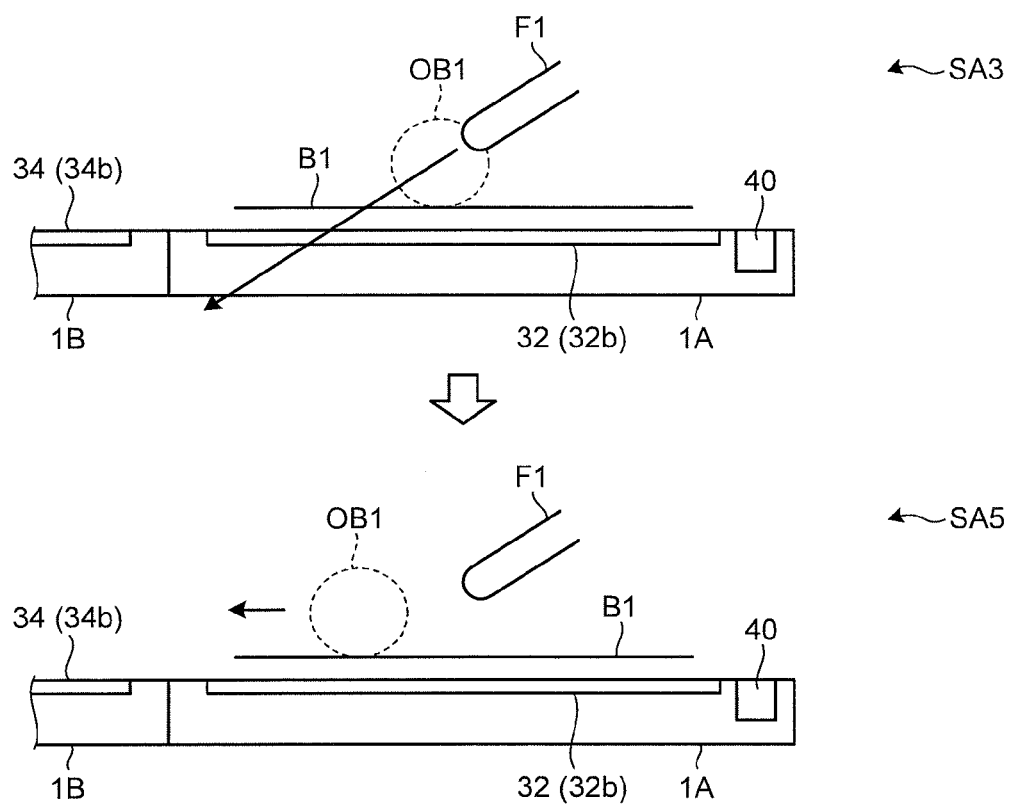
FIG. 12 is a diagram for explaining detection of an operation of pushing the three-dimensional object and a change of the three-dimensional object according to the detected operation.

FIG. 11 and FIG. 12 are diagrams for explaining detection of an operation of pushing a three-dimensional object and a change of the three-dimensional object according to the detected operation. At Step SA1 in FIG. 11, the touch panel 32 stereoscopically displays a three-dimensional object OB1 in the three-dimensional space on the first housing 1A side. The three-dimensional object OB1 is, for example, an object resembling a ball. At Step SA1, the touch panel 32 also displays a bottom surface B1 supporting the three-dimensional object OB1.

At Step SA2, the user places the finger F1 on a position in contact with the three-dimensional object OB1 and keeps the finger F1 still as it is. When a real object is detected in the three-dimensional space and a state of the object in contact with the three-dimensional object OB1 continues for a longer period of time than a predetermined time, the mobile phone 1 determines that the three-dimensional object OB1 has been selected as an operation target. The mobile phone 1 then, for example, changes a display mode of the three-dimensional object OB1 to notify the user that the three-dimensional object OB1 has been selected as the operation target.

The determination as to whether the object is in contact with the three-dimensional object OB1 is made based on an actual position of the object in the three-dimensional space and based on a shape and a calculated position of the three-dimensional object OB1 in the three-dimensional space. The shape of the three-dimensional object OB1 is defined in the object data 24b.

The position of the object is calculated based on an image captured by the imaging unit 40 or the imaging unit 42. The position of the object may be calculated based on the size of a previously registered object and based on the size and the position of the object in the image. The position of the object may also be calculated by analyzing a plurality of images captured by different imaging units, such as, by checking the size and the position of the object in the image captured by the imaging unit 40a against the size and the position of the object in the image captured by the imaging unit 40b. The detection of the object such as the finger may be implemented using a known technology. When the object is the finger, the process may be performed by setting a position of the tip of the finger as a position of the object.

A calculated position of the three-dimensional object OB1 in the three-dimensional space is calculated based on a position of the three-dimensional object OB1 on the display surface of the touch panel 32 and an amount of "floating" of the three-dimensional object OB1 in the three-dimensional space. The amount of floating of the three-dimensional object OB1 in the three-dimensional space may be a value determined upon display or may be a value calculated from a difference between positions of the three-dimensional object OB1 in an image for a right eye and in an image for a left eye, which are used to stereoscopically display the three-dimensional object OB1.

The selection as the operation target is notified by, for example, changing the whole color of the three-dimensional object OB1 or changing a color near a position, within the surface of the three-dimensional object OB1, in contact with the object. Instead of or in addition to such visual notification, a sound and/or a vibration may be used to perform the notification.

In this way, when the state of the real object such as the finger in contact with the three-dimensional object OB1 is continuously detected for a longer period of time than a predetermined time, the mobile phone 1 determines that the three-dimensional object OB1 has been selected as the operation target. By adding the continuous detection of the contact state for the longer period of time than the predetermined time to the condition, the user can be prevented from selecting an unintended three-dimensional object as an operation target during the process of moving the finger in order to operate another three-dimensional object.

It is assumed that after the selection of the three-dimensional object OB1 as the operation target, as illustrated at Step SA3, the user moves the finger F1 inside the three-dimensional object OB1 so as to push the three-dimensional object OB1. When detecting an operation of moving the object inside the three-dimensional object selected as the operation target, the mobile phone 1 changes the three-dimensional object according to the operation. How to change the three-dimensional object is determined based on the type of the three-dimensional object defined in the object data 24b and the rule of the change defined in the action data 24c in association with the type.

For example, it is assumed that the object data 24b defines a three-dimensional object OB1 as an elastic body and the action data 24c defines that the elastic body is deformed, when it is pushed, according to a pushed amount in its pushed direction. In this case, as illustrated at SA4, the mobile phone 1 changes the three-dimensional object OB1 as if a portion which the finger F1 has entered dents by pushing.

It is also assumed that the object data 24b defines a three-dimensional object OB1 as a rigid body and the action data 24c defines that the rigid body is moved, when it is pushed, according to a pushed amount in its pushed direction. In this case, as illustrated at Step SA5 in FIG. 12, the mobile phone 1 moves the three-dimensional object OB1 in a direction in which the finger F1 is moving as if it is pushed by the finger F1. At Step SA5 in FIG. 12, the three-dimensional object OB1 is supported by the bottom surface B1, and therefore it is moving according to a component of the force which is applied by the rigid body, the component in a direction parallel the bottom surface B1.

In this way, when the operation of pushing the three-dimensional object OB1 is detected, the three-dimensional object OB1 is changed based on the object data 24b and the action data 24c, which enables the three-dimensional object OB1 to be variously changed according to each operation. The pushing operation is an operation used in various scenes in the real world, and therefore by detecting the operation of pushing the three-dimensional object OB1 and by executing the corresponding process, intuitive and user-friendly operability can be achieved.

The object used to operate the three-dimensional object is not limited to the finger, and therefore may be a hand, a foot, a stick, a tool, or so. A mode to change the three-dimensional object according to the pushing operation may follow actual physical law or may be that which is actually impossible.

When the pushed direction of the three-dimensional object is not parallel to the display surface of the touch panel 32, that is, when the moving direction of the detected object intersects the display surface of the touch panel 32 or intersects a horizontal plane parallel to the display surface thereof, the mobile phone 1 also changes the three-dimensional object according to the operation. In this way, by stereoscopically determining the operation of pushing the three-dimensional object, various operations can be performed for the three-dimensional object. To stereoscopically determine the operation of pushing the three-dimensional object, a plurality of imaging units are desirably prepared to capture the finger F1 or so from different directions so that an obstacle will not cause a blind spot.

Then the action data 24c illustrated in FIG. 4 will be explained in more detail below with reference to FIG. 13 to FIG. 18. FIG. 13 to FIG. 18 are diagrams of examples of information stored in the action data 24c.

The action data 24c stores therein information for changes made when the pushing operation is detected, for each type of three-dimensional objects. As illustrated in FIG. 13, when the type of a three-dimensional object is "rigid body", a change made when the pushing operation is detected differs according to whether a fulcrum exists, whether any obstacle is present in its pushed direction, and a pushed speed. The obstacle mentioned here indicates some other three-dimensional object. Whether the pushed speed is high or low is determined based on a threshold.

When there is no fulcrum in a three-dimensional object and there is no obstacle in its pushed direction, the three-dimensional object is displayed so as to move in the pushed direction according to a pushed amount. Examples of the three-dimensional object displayed in this manner include blocks, a pen, a book, etc. As for the way to move, whether the three-dimensional object is slid or rotated may be determined based on the shape thereof. Whether the three-dimensional object is moved together with a pushing object or is moved separately from the pushing object so as to be flicked by the pushing object may be determined based on the pushed speed, or may be determined based on a calculated value or set value of frictional resistance between the three-dimensional object and the bottom surface.

When there is no fulcrum in a three-dimensional object and there is a fixed obstacle in its pushed direction, then the three-dimensional object is displayed so as to move in the pushed direction according to a pushed amount and to stop the movement when it comes in contact with the obstacle. Examples of the three-dimensional object displayed in this manner include blocks, a pen, a book, etc. When the pushed speed is high, the three-dimensional object may break the obstacle and continue to move. When the three-dimensional object comes in contact with an obstacle while moving away from a pushing object as if it is flicked by the pushing object, the three-dimensional object may be moved in an opposite direction as if it has bounced off the obstacle.

When there is no fulcrum in a three-dimensional object and there is any other rigid body which is not fixed in its pushed direction, and the pushed speed is low, then the three-dimensional object is displayed so as to move in the pushed direction according to a pushed amount and to move together with the any other rigid body after the three-dimensional object comes in contact with the any other rigid body. When there is no fulcrum in a three-dimensional object, there is any other rigid body which is not fixed in its pushed direction, and the pushed speed is high, then the three-dimensional object is displayed so as to move in the pushed direction according to a pushed amount. After in contact with the any other rigid body, the three-dimensional object is displayed so as to move as if the any other rigid body is flicked thereby. After in contact with the any other rigid body, the three-dimensional object may be stopped in that spot, or the movement may be slowed down and continued. Examples of the combination of the three-dimensional object and the any other rigid body displayed in this manner include a combination of a ball and a pin of bowling, a combination of marbles, etc.

When there is no fulcrum in a three-dimensional object, there is any other rigid body which is not fixed in its pushed direction, and the three-dimensional object can pass through the any other rigid body, then the three-dimensional object is displayed so as to move in the pushed direction according to a pushed amount, to pass through the any other rigid body even after the three-dimensional object comes in contact with it, and to continuously move as it is. In reality, a rigid body is impossible to pass through any other rigid body; however, by allowing such a pass-through, fresh experience can be provided to the user. Examples of the combination of the three-dimensional object and the any other rigid body displayed in this manner include a combination of a ball and a pin of bowling, a combination of marbles, etc. It may be set that the three-dimensional object does not pass through any other rigid body when a threshold is provided with respect to the pushed speed and the pushed speed is slower than the threshold.

When there is a fulcrum in a three-dimensional object, the three-dimensional object is displayed so as to rotate around the fulcrum according to pushed direction and amount. The rotation mentioned here may be continuous rotation through 360 degrees or may be a reciprocating swing motion within a predetermined turning range. Examples of the three-dimensional object displayed in this manner include a pendulum, a sand bag for boxing, a windmill, etc.

As illustrated in FIG. 14, when the type of a three-dimensional object is "elastic body", a change made when a pushing operation is detected differs according to a material, whether its change amount is limited, and a pushed speed. The material mentioned here is an assumed material of the three-dimensional object, which is defined in the object data 24b.

When the material of a three-dimensional object is a rubber-based material without limitation to its change amount and the pushed speed is low, the three-dimensional object is displayed so as to deform in its pushed direction according to a pushed amount and to return to its original shape when it is released from the pushed state. When the material of a three-dimensional object is a rubber-based material without limitation to its change amount and the pushed speed is high, the three-dimensional object is displayed so as to deform in its pushed direction according to a pushed amount. Thereafter, the three-dimensional object is displayed as if it is flicked to move in the pushed direction while returning to its original shape. Examples of the three-dimensional object displayed in this manner include a rubber ball, a rubber eraser, etc.

When the material of the three-dimensional object is a rubber-based material with limitation to the change amount, the three-dimensional object is displayed so as to deform in the pushed direction up to a deformable range according to the pushed amount. Then, when the further pushing operation is detected, the three-dimensional object is displayed so as to move in the pushed direction while returning to its original shape. Examples of the three-dimensional object displayed in this manner include a rubber ball, a rubber eraser, etc.

When the material of a three-dimensional object is a metal-based material, the three-dimensional object is displayed so as to deform up to a deformable range in its pushed direction according to a pushed amount. Then, when it is released from the pushed state, the three-dimensional object is displayed so that the returning to its original shape and the deformation are repeated (vibrated). If the three-dimensional object is pushed in any direction other than the deformable direction, the three-dimensional object moves similarly to the rigid body. Examples of the three-dimensional object displayed in this manner include a plate spring, a helical spring, etc.

As illustrated in FIG. 15, when the type of a three-dimensional object is "plastic body", the three-dimensional object is displayed so that its pushed portion dents and the entire shape is thereby deformed. Examples of the three-dimensional object displayed in this manner include clay, etc.

As illustrated in FIG. 16, when the type of a three-dimensional object is "liquid", a change made when a pushing operation is detected differs according to a pushed speed. When the pushed speed is low, the pushing object is displayed so as to be soaked in the three-dimensional object, that is, in the liquid. When the pushed speed is medium, the pushing object is displayed so as to be soaked in the liquid with ripples spreading across the liquid. When the pushed speed is high, the pushing object is displayed so as to be soaked in the liquid with water splashes from the liquid. Examples of the three-dimensional object displayed in this manner include water in a glass, etc.

As illustrated in FIG. 17, when the type of a three-dimensional object is "gas", a change made when a pushing operation is detected differs according to a pushed speed. When the pushed speed is low, the three-dimensional object, that is, the gas is displayed so as to be blocked by the pushing object and be floating around the pushing object. When the pushed speed is medium, the gas is displayed so as to be scattered by the pushing object. When the pushed speed is high, the gas is displayed so that eddy is produced in the gas due to turbulent flow at the rear side of the pushing object in the moving direction. Examples of the three-dimensional object displayed in this manner include smoke, etc.

As illustrated in FIG. 18, when the type of a three-dimensional object is "aggregation", a change made when a pushing operation is detected differs according to how elements of the aggregation are combined. When the elements of the aggregation are not combined, the three-dimensional object is displayed so that its pushed portion dents and the entire shape as the aggregation is thereby changed. Examples of the three-dimensional object displayed in this manner include sands, sugar, etc.

When the elements of the aggregation are combined, the three-dimensional object is displayed so that its pushed portion dents and the entire shape as the aggregation is thereby changed. Moreover, it may be displayed so that any elements other than the pushed portion are pulled by the element at the pushed portion and are moved. Examples of the three-dimensional object displayed in this manner include a chain, etc.

When the elements of the aggregation are not combined but attractive force or repulsive force acts between the elements and a pushing object, the three-dimensional object is displayed so as to move without in contact with the pushing object. When the attractive force acts between the elements and the pushing object, the three-dimensional object is attracted to the pushing object without in contact with the pushing object when it enters within a predetermined distance to the pushing object. When the repulsive force acts between the elements and the pushing object, the three-dimensional object is repelled from the pushing object without in contact with the pushing object when it enters within a predetermined distance to the pushing object. Examples of the combination of the three-dimensional object and the pushing object displayed in this manner include a combination of iron powder and a magnet, etc. In this case, the finger, for example, may be used as a magnet.

In this way, by changing the three-dimensional object based on the information stored in the object data 24b and the information stored in the action data 24c, the three-dimensional object can be variously changed according to the pushing operation. The information stored in the object data 24b and in the action data 24c is not limited to the examples, and therefore may be appropriately varied depending on intended use or so. For example, settings may be made so that the way to change the three-dimensional object is switched according to the type and the size of the pushing object and/or the size of a contact area between the pushing object and the three-dimensional object, etc.

Figure 19:
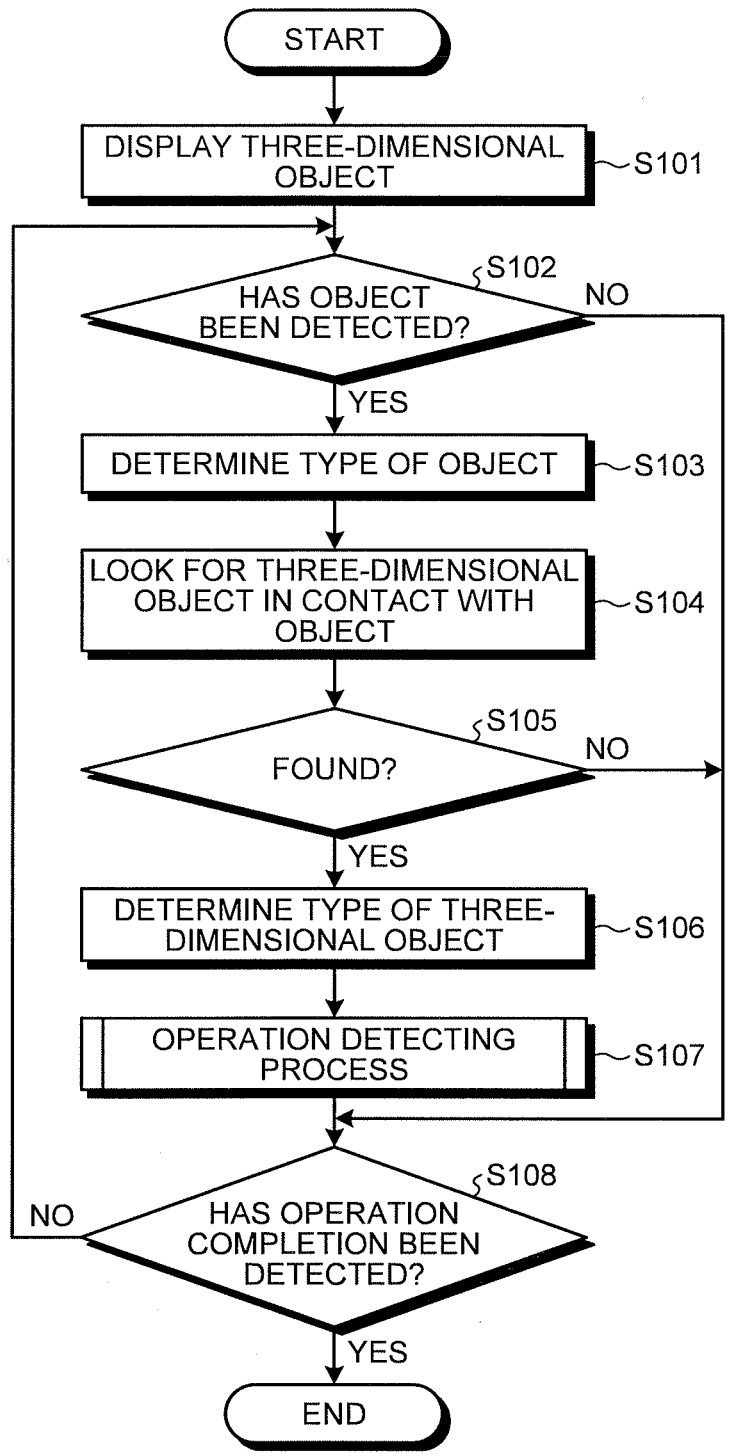
FIG. 19 is a flowchart of a procedure for a contact detecting process in the operation of pushing the three-dimensional object.

Then a procedure for an operation of pushing a three-dimensional object executed by the mobile phone 1 will be explained with reference to FIG. 19 and FIG. 20. FIG. 19 is a flowchart of a procedure for a contact detecting process in the operation of pushing the three-dimensional object. The procedure illustrated in FIG. 19 is implemented by the control unit 22 executing the control program 24a triggered by, for example, detection of a predetermined operation.

As illustrated in FIG. 19, first of all, at Step S101, the control unit 22 stereoscopically displays a three-dimensional object based on the object data 24b. The object data 24b may be previously stored in the storage unit 24 or may be acquired from any other device such as a server through communication by the communication unit 26.

Subsequently, at Step S102, the control unit 22 determines whether the detector, that is, the imaging unit 40 or the imaging unit 42 has detected a predetermined object. The predetermined object is, for example, a user's finger. When the predetermined object has not been detected (No at Step S102), then at Step S108, the control unit 22 determines whether operation completion has been detected.

The operation completion may be detected, for example, when a predetermined operation is performed for the operating unit 13 or when a predetermined operation is performed for the touch panel 32 or the touch panel 34. The operation completion may also be detected when a predetermined user's hand gesture is captured by the imaging unit 40 or the imaging unit 42. When the operation completion has been detected (Yes at Step S108), the control unit 22 ends the contact detecting process. When the operation completion has not been detected (No at Step S108), the control unit 22 re-executes Step S102 and the subsequent steps.

When the predetermined object has been detected (Yes at Step S102), then at Step S103, the control unit 22 determines the type of the predetermined object. The type of the predetermined object is determined based on the size, the shape, the color, and so on of the object in an image captured by the imaging unit 40 or the imaging unit 42. Subsequently, at Step S104, the control unit 22 looks for a three-dimensional object in contact with the predetermined object.

When there is no three-dimensional object in contact with the predetermined object (No at Step S105), then at Step S108, the control unit 22 determines whether the operation completion has been detected. When the operation completion has been detected (Yes at Step S108), the control unit 22 ends the contact detecting process. When the operation completion has not been detected (No at Step S108), the control unit 22 re-executes Step S102 and the subsequent steps.

When a three-dimensional object in contact with the predetermined object has been found (Yes at Step S105), then at Step S106, the control unit 22 determines the type of the three-dimensional object in contact with the predetermined object based on the object data 24b. Then at Step S107, the control unit 22 executes an operation detecting process explained later. Thereafter, at Step S108, the control unit 22 determines whether the operation completion has been detected. When the operation completion has been detected (Yes at Step S108), the control unit 22 ends the contact detecting process. When the operation completion has not been detected (No at Step S108), the control unit 22 re-executes Step S102 and the subsequent steps.

Figure 20:
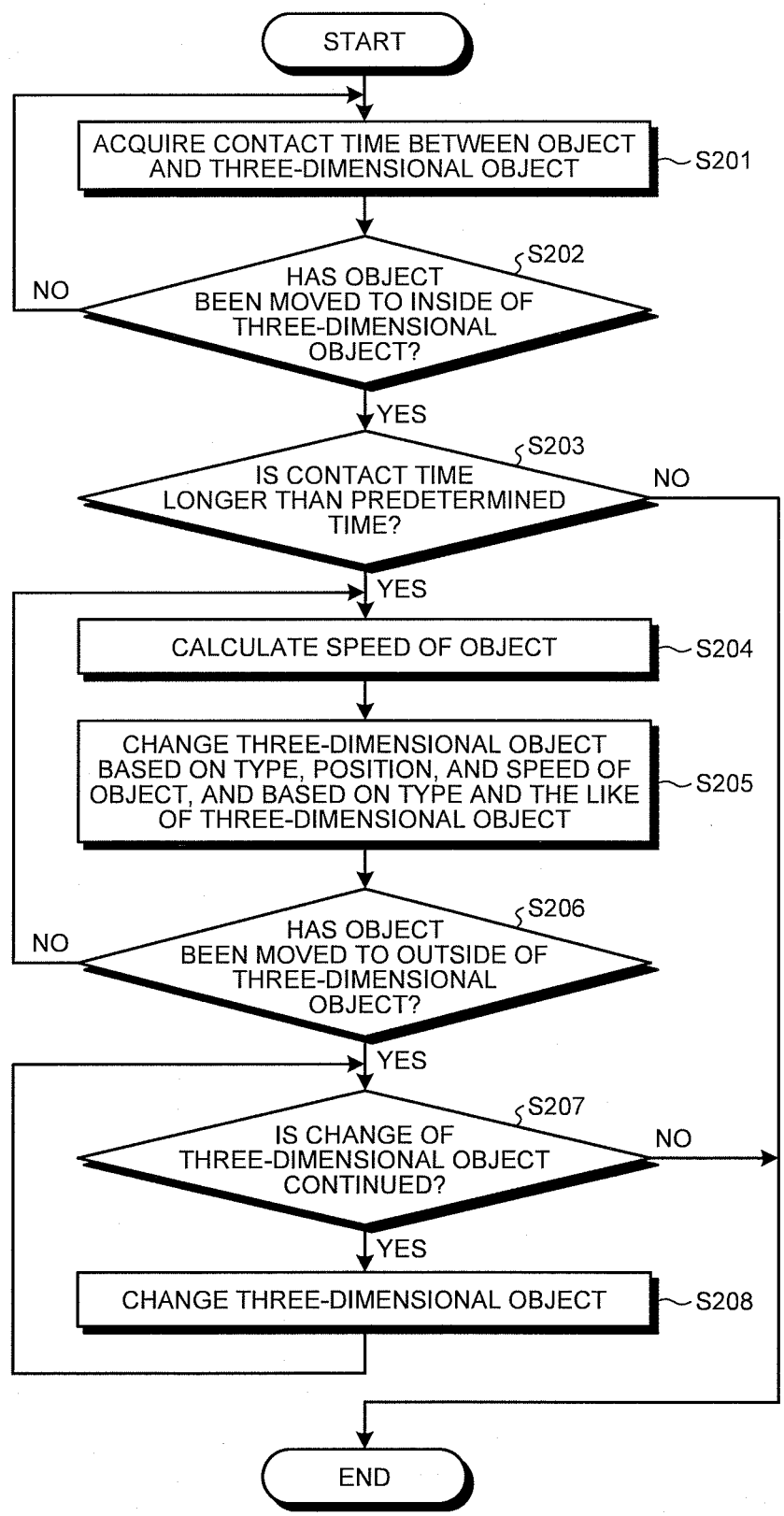
FIG. 20 is a flowchart of a procedure for an operation detecting process in the operation of pushing the three-dimensional object.

FIG. 20 is a flowchart of a procedure for the operation detecting process in the operation of pushing the three-dimensional object. The procedure illustrated in FIG. 20 is implemented by the control unit 22 executing the control program 24a.

As illustrated in FIG. 20, first of all, at Step S201, the control unit 22 acquires a contact time between the predetermined object and the three-dimensional object. Then at Step S202, the control unit 22 determines whether the predetermined object has been moved to the inside of the three-dimensional object. When the predetermined object has not been moved to the inside of the three-dimensional object (No at Step S202), the control unit 22 re-executes Step S201 and the subsequent step.

When the predetermined object has been moved to the inside of the three-dimensional object (Yes at Step S202), then at Step S203, the control unit 22 determines whether the contact time is longer than a predetermined time. When the contact time is not longer than the predetermined time (No at Step S203), it is determined that the three-dimensional object is not the operation target, and therefore the control unit 22 ends the operation detecting process.

When the contact time is longer than the predetermined time (Yes at Step S203), then at Step S204, the control unit 22 calculates a speed of the predetermined object. At Step S205, the control unit changes the three-dimensional object based on the type, the position, and the speed of the predetermined object and based on the type and the like of the three-dimensional object. A specific way to change the three-dimensional object is determined according to the action data 24c.

Subsequently, at Step S206, the control unit 22 determines whether the predetermined object has been moved to the outside of the three-dimensional object. When the predetermined object has not been moved to the outside of the three-dimensional object, that is, when the pushing operation is continued (No at Step S206), the control unit 22 re-executes Step S204 and the subsequent steps.

When the predetermined object has been moved to the outside of the three-dimensional object, that is, when the three-dimensional object has been released (Yes at Step S206), then at Step S207, the control unit 22 determines whether the change of the three-dimensional object is continued. For example, when it is defined in the action data 24c that the vibration is continued for a predetermined time even after the release, the control unit 22 determines that the change of the three-dimensional object is continued.

When the change of the three-dimensional object is continued (Yes at Step S207), then at Step S208, the control unit 22 changes the three-dimensional object, and thereafter re-executes Step S207 and the subsequent step. When the change of the three-dimensional object is not continued (No at Step S207), the control unit 22 ends the operation detecting process.

When an operation performed for the three-dimensional object is detected based on the procedures illustrated in FIG. 19 and FIG. 20, a threshold used to determine the validity of operations, when the operations conflict with each other, may be set to the length longer than the predetermined time which is used at Step S203. By setting the threshold in this manner, it is possible to reduce the possibility that an operation performed for the three-dimensional object may be determined as invalid caused by any other action than the operation performed for the three-dimensional object.

Figure 21:
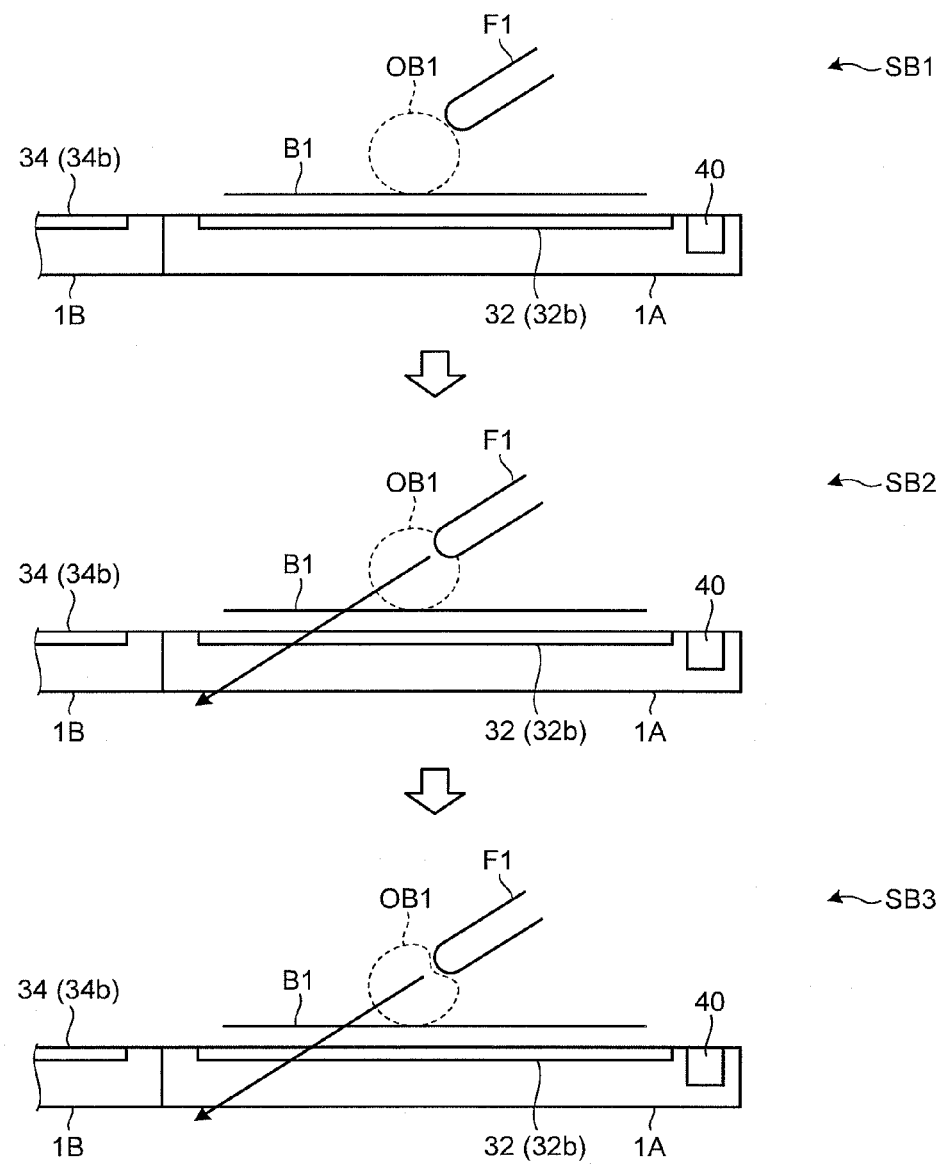
FIG. 21 is a diagram for explaining a first modification of a detection method for an operation of pushing the three-dimensional object.

A detection method for an operation of pushing a three-dimensional object is not limited to the method. FIG. 21 is a diagram for explaining a first modification of the detection method for an operation of pushing the three-dimensional object. At Step SB1 in FIG. 21, the user brings the finger F1 into contact with the three-dimensional object OB1, and at Step SB2, the user moves the finger F1 inside the three-dimensional object OB1.

When a real object has been detected in the three-dimensional space and the state in which the object comes in contact with the three-dimensional object OB1 and then moves to the inside of the three-dimensional object OB1 is continued for the longer period of time than the predetermined time, then the mobile phone 1 determines that the three-dimensional object OB1 has been selected as the operation target. The mobile phone 1 then, for example, changes the display mode of the three-dimensional object OB1 to notify the user that the three-dimensional object OB1 has been selected as the operation target. Moreover, as illustrated at Step SB3, the mobile phone 1 changes the three-dimensional object OB1 according to the operation by the finger F1 after the detection of the contact as if it is already selected as an object of the pushing operation at the stage of Step SB1.

In this way, it is configured that the pushing operation can be detected after the contact between the object and the three-dimensional object is detected even if the object does not remain in that spot, which enables the user to quickly start the operation of pushing the three-dimensional object. By adding the state, in which the object after the contact moves to the inside of the three-dimensional object OB1 continues for the longer period of time than the predetermined time, to the condition, the user can be prevented from selecting an unintended three-dimensional object as an operation target during the process of moving the finger in order to operate any other three-dimensional object.

Figure 22:
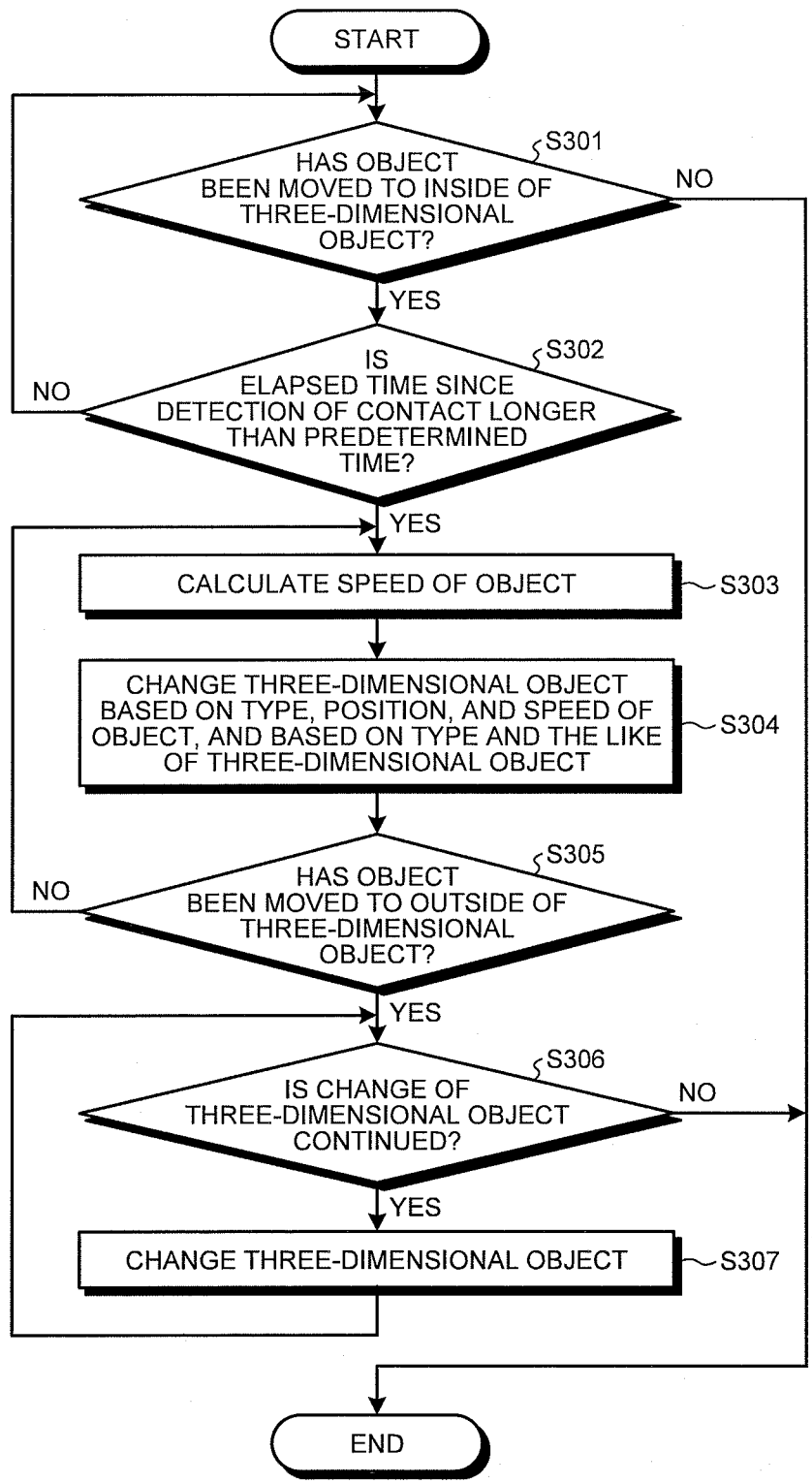
FIG. 22 is a flowchart of a procedure for an operation detecting process according to the first modification of the detection method for the operation of pushing the three-dimensional object.

FIG. 22 is a flowchart of a procedure for an operation detecting process according to the first modification of the detection method for the operation of pushing the three-dimensional object. The procedure illustrated in FIG. 22 is implemented by the control unit 22 executing the control program 24a. The procedure for the contact detecting process according to the first modification is the same as that illustrated in FIG. 19.

As illustrated in FIG. 22, first of all, at Step S301, the control unit 22 determines whether the predetermined object has been moved to the inside of the three-dimensional object. When the predetermined object has not been moved to the inside of the three-dimensional object (No at Step S301), it is determined that the three-dimensional object is not the operation target, and therefore the control unit 22 ends the operation detecting process.

When the predetermined object has been moved to the inside of the three-dimensional object (Yes at Step S301), then at Step S302, the control unit 22 determines whether an elapsed time since the detection of the contact is longer than a predetermined time. When the elapsed time is not longer than the predetermined time (No at Step S302), the control unit 22 re-executes Step S301 and the subsequent step.

When the elapsed time is longer than the predetermined time (Yes at Step S302), then at Step S303, the control unit 22 calculates a speed of the predetermined object. At Step S304, the control unit 22 changes the three-dimensional object based on the type, the position, and the speed of the predetermined object and based on the type and the like of the three-dimensional object. A specific way to change the three-dimensional object is determined according to the action data 24c.

Subsequently, at Step S305, the control unit 22 determines whether the predetermined object has been moved to the outside of the three-dimensional object. When the predetermined object has not been moved to the outside of the three-dimensional object, that is, when the pushing operation is continued (No at Step S305), the control unit 22 re-executes Step S303 and the subsequent steps.

When the predetermined object has been moved to the outside of the three-dimensional object, that is, when the three-dimensional object has been released (Yes at Step S305), then at Step S306, the control unit 22 determines whether the change of the three-dimensional object is continued. For example, when it is defined in the action data 24c that the vibration is continued for a predetermined time even after the release, the control unit 22 determines that the change of the three-dimensional object is continued.

When the change of the three-dimensional object is continued (Yes at Step S306), then at Step S307, the control unit 22 changes the three-dimensional object, and thereafter re-executes Step S306 and the subsequent step. When the change of the three-dimensional object is not continued (No at Step S306), the control unit 22 ends the operation detecting process.

When an operation performed for the three-dimensional object is detected based on the first modification, a threshold used to determine the validity of operations, when the operations conflict with each other, may be set to the length longer than the predetermined time which is used at Step S302. By setting the threshold in this manner, it is possible to reduce the possibility that an operation performed for the three-dimensional object may be determined as invalid caused by any other action than the operation performed for the three-dimensional object.

Figure 23:
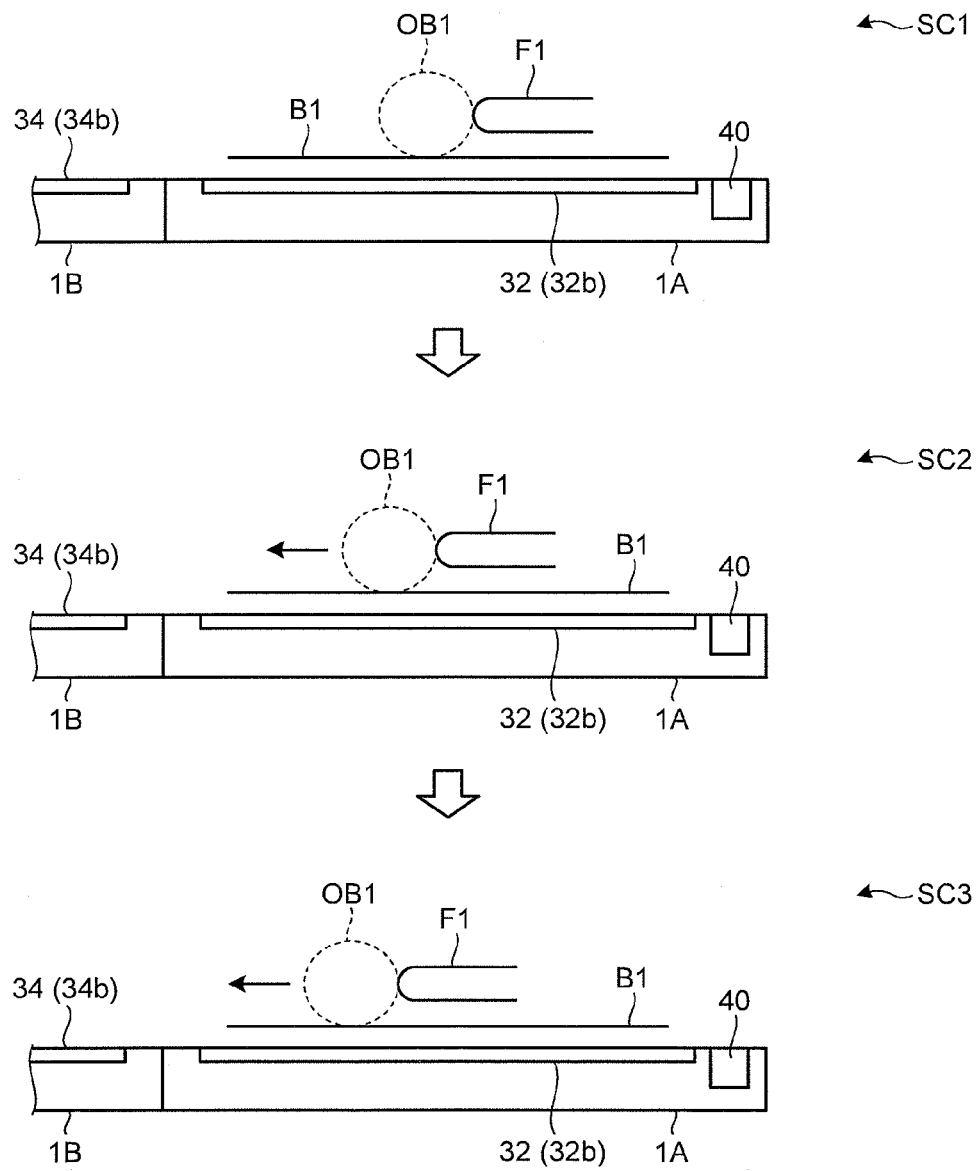
FIG. 23 is a diagram for explaining a second modification of the detection method for the operation of pushing the three-dimensional object.
Figure 24:
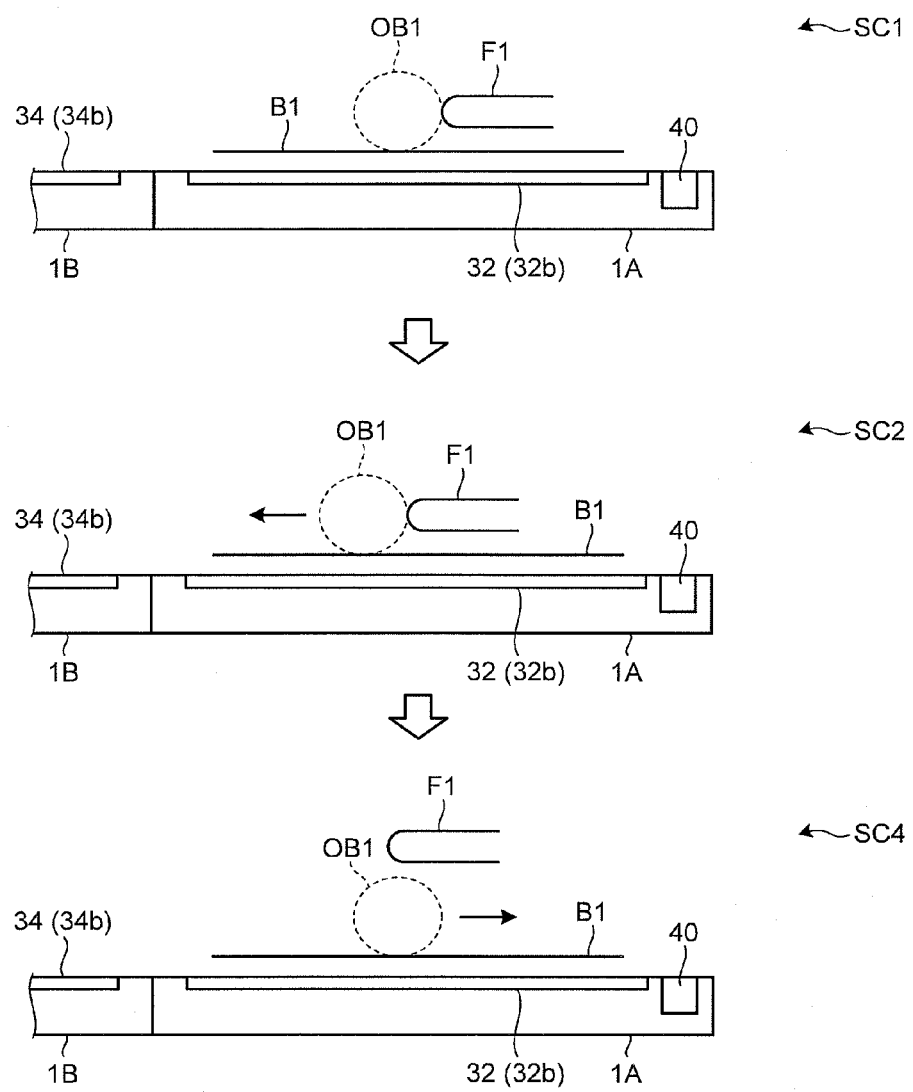
FIG. 24 is a diagram for explaining the second modification of the detection method for the operation of pushing the three-dimensional object.

FIG. 23 and FIG. 24 are diagrams for explaining a second modification of the detection method for an operation of pushing the three-dimensional object. At Step SC1 in FIG. 23, the touch panel 32 stereoscopically displays the three-dimensional object OB1 in the three-dimensional space. The user brings the finger F1 into contact with the three-dimensional object OB1.

It is assumed that the user moves the finger F1 inside the three-dimensional object OB1. When it is detected that the object in contact with the three-dimensional object OB1 has been moved to the inside of the three-dimensional object OB1, then as illustrated at Step SC2, the mobile phone 1 changes the three-dimensional object OB1, from that point on, according to the operation by the finger F1. In the example of FIG. 23, at Step SC2, the three-dimensional object OB1 starts moving together with the movement of the finger F1.

As illustrated at Step SC3, the mobile phone 1 determines the three-dimensional object OB1 as the operation target at the stage when the movement of the finger F1 to the inside of the three-dimensional object OB1 has been continued for the longer period of time than the predetermined time. The mobile phone 1 then, for example, changes the display mode of the three-dimensional object OB1 to notify the user that the three-dimensional object OB1 has been determined as the operation target. Thereafter, the mobile phone 1 continues changing the three-dimensional object OB1 as long as the movement of the finger F1 to the inside of the three-dimensional object OB1 is detected.

As illustrated at Step SC4 in FIG. 24, when the movement of the finger F1 to the inside of the three-dimensional object OB1 becomes undetectable before the predetermined time elapses, the mobile phone 1 makes a reverse change to the change made so far to the three-dimensional object OB1. Consequently, the three-dimensional object OB1 is displayed at the same position as that at the stage of Step SC1 in the same state. The speed at which the reverse change is made to the three-dimensional object OB1 may be higher than the speed at which the change is made to the three-dimensional object OB1 so far. Namely, the three-dimensional object OB1 may be reversely changed as if it is reversely reproduced at a high speed.

In this way, by starting making the change to the three-dimensional object from the stage when the entry of the object to the inside of the three-dimensional object is detected, the user can recognize that the three-dimensional object is being selected before the selection is determined. As a result, the user is able to know, at an early point, whether an intended three-dimensional object has been selected. When an unintended three-dimensional object has been selected, the user stops the operation before the predetermined time elapses and can thereby return the three-dimensional object which is unintentionally being selected to its original state.

Until the movement of the finger F1 to the inside of the three-dimensional object OB1 is continued for the longer period of time than the predetermined time, the three-dimensional object which is being changed may be displayed in a mode (e.g., half-transparent mode) different from a normal mode or from a mode in which the selection has been determined as the operation target. By changing the display mode in this manner, the user can easily determine the state of the three-dimensional object.

Figure 25:
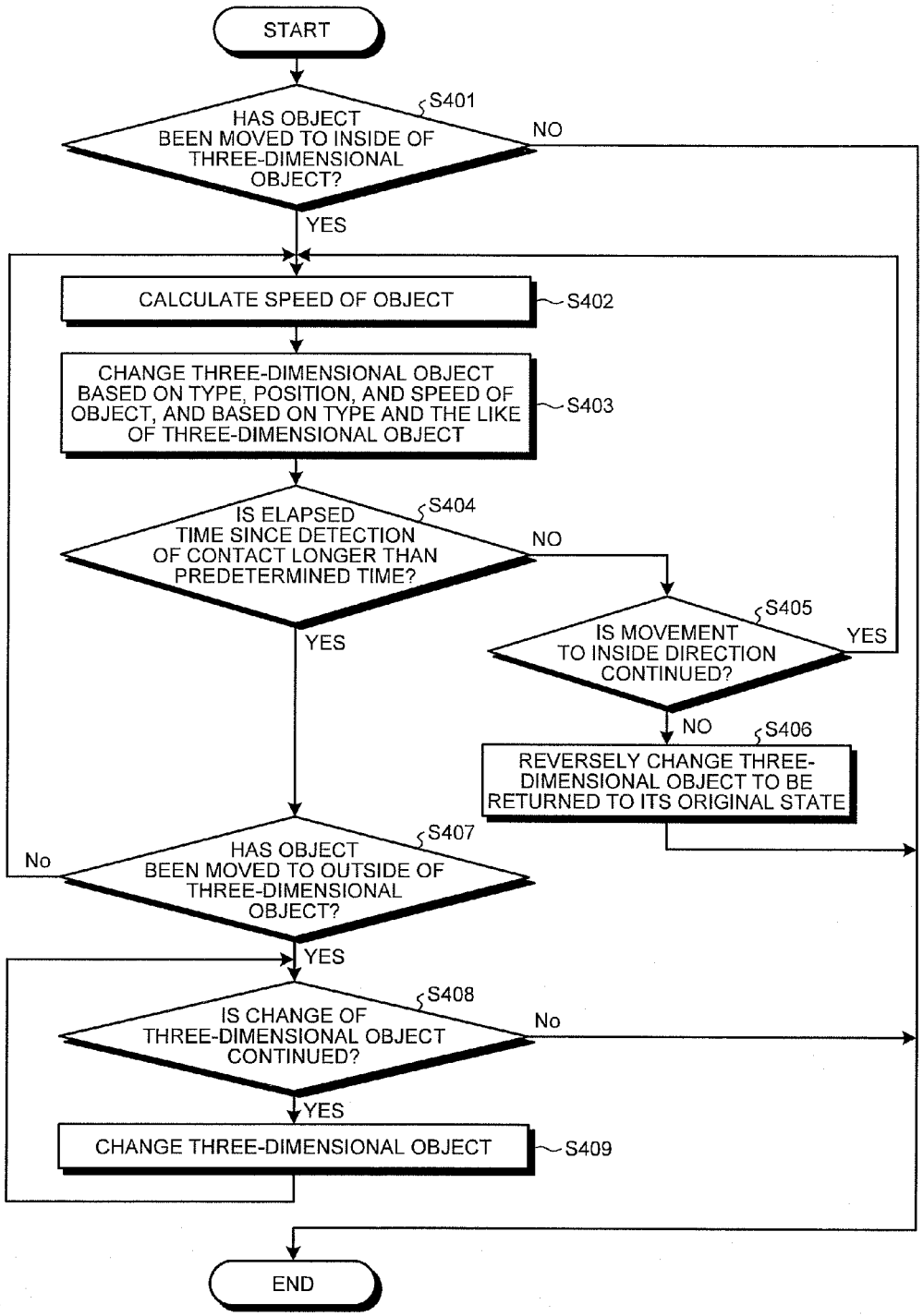
FIG. 25 is a flowchart of a procedure for an operation detecting process according to the second modification of the detection method for the operation of pushing the three-dimensional object.

FIG. 25 is a flowchart of the procedure for the operation detecting process according to the second modification of the detection method for an operation of pushing the three-dimensional object. The procedure illustrated in FIG. 25 is implemented by the control unit 22 executing the control program 24a. The procedure for the contact detecting process according to the second modification is the same as that illustrated in FIG. 19.

As illustrated in FIG. 25, first of all, at Step S401, the control unit 22 determines whether the predetermined object has been moved to the inside of the three-dimensional object. When the predetermined object has not been moved to the inside of the three-dimensional object (No at Step S401), it is determined that the three-dimensional object is not the operation target, and therefore the control unit 22 ends the operation detecting process.

When the predetermined object has been moved to the inside of the three-dimensional object (Yes at Step S401), then at Step S402, the control unit 22 calculates a speed of the predetermined object. At Step S403, the control unit 22 changes the three-dimensional object based on the type, the position, and the speed of the predetermined object and based on the type and the like of the three-dimensional object. A specific way to change the three-dimensional object is determined according to the action data 24c.

Subsequently, at Step S404, the control unit 22 determines whether an elapsed time since the detection of the contact is longer than a predetermined time. When the elapsed time is not longer than the predetermined time, that is, when the three-dimensional object is not determined as an object of the pushing operation (No at Step S404), then at Step S405, the control unit 22 determines whether the movement of the predetermined object to the inside direction of the three-dimensional object is continued.

When the movement of the predetermined object to the inside direction of the three-dimensional object is continued (Yes at Step S405), the control unit 22 re-executes Step S402 and the subsequent steps. When the movement of the predetermined object to the inside direction of the three-dimensional object is not continued (No at Step S405), then at Step S406, the control unit 22 reversely changes the three-dimensional object OB1 to be returned to its original state. The control unit 22 then ends the operation detecting process.

When the elapsed time since the detection of the contact is longer than the predetermined time (Yes at Step S404), then at Step S407, the control unit 22 determines whether the predetermined object has been moved to the outside of the three-dimensional object. When the predetermined object has not been moved to the outside of the three-dimensional object, that is, when the pushing operation is continued (No at Step S407), the control unit 22 re-executes Step S402 and the subsequent steps.

When the predetermined object has been moved to the outside of the three-dimensional object, that is, when the three-dimensional object has been released (Yes at Step S407), then at Step S408, the control unit 22 determines whether the change of the three-dimensional object is continued. For example, when it is defined in the action data 24c that the vibration is continued for a predetermined time even after the release, it is determined that the change of the three-dimensional object is continued.

When the change of the three-dimensional object is continued (Yes at Step S408), then at Step S409, the control unit 22 changes the three-dimensional object, and thereafter re-executes Step S408 and the subsequent step. When the change of the three-dimensional object is not continued (No at Step S408), the control unit 22 ends the operation detecting process.

When an operation performed for the three-dimensional object is detected based on the second modification, a threshold used to determine the validity of operations, when the operations conflict with each other, may be set to the length longer than the predetermined time which is used at Step S404. By setting the threshold in this manner, it is possible to reduce the possibility that an operation performed for the three-dimensional object may be determined as invalid caused by any other action than the operation performed for the three-dimensional object.

Figure 26:
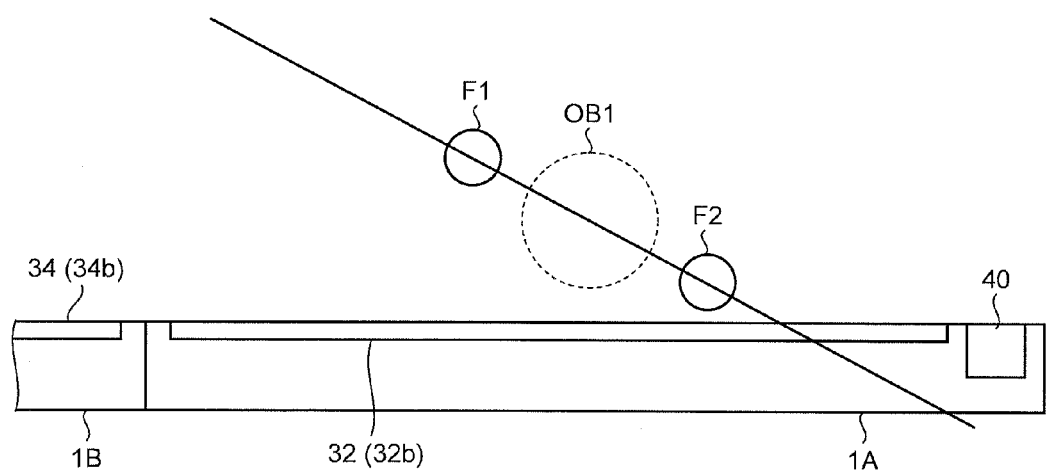
FIG. 26 is a diagram for explaining detection of an operation performed with the three-dimensional object pinched.

The operation of pushing the three-dimensional object has been explained in the above description; however, the mobile phone 1 can detect an operation performed with a three-dimensional object pinched. FIG. 26 is a diagram for explaining detection of an operation performed with a three-dimensional object pinched. As illustrated in FIG. 26, the touch panel 32 stereoscopically displays a three-dimensional object OB1 in the three-dimensional space on the first housing 1A side.

It is assumed that the user wishes to perform an operation performed with the three-dimensional object OB1 pinched. To perform the operation performed with the three-dimensional object OB1 pinched, first of all, the three-dimensional object OB1 has to be selected as an operation target. To select the three-dimensional object OB1, as illustrated in FIG. 26, the user moves the finger F1 and a finger F2 so that the three-dimensional object OB1 is located between the finger F1 and the finger F2, and maintains this state for a longer period of time than a predetermined time.

When two objects are detected within the three-dimensional space and the state of the three-dimensional object OB1 located between the two objects continues for the longer period of time than the predetermined time, the mobile phone 1 determines that the three-dimensional object OB1 has been selected, and sets the three-dimensional object OB1 to be in a selected state. The mobile phone 1 then, for example, changes the display mode of the three-dimensional object OB1 to notify the user that the three-dimensional object OB1 is in the selected state.

The determination as to whether the three-dimensional object OB1 is located between the two objects is performed based on actual positions of the two objects in the three-dimensional space and based on a shape and a calculated position of the three-dimensional object OB1 in the three-dimensional space. The three-dimensional object OB1 set in the selected state is notified by, for example, changing the whole color of the three-dimensional object OB1 or changing a color near a position, within the surface of the three-dimensional object OB1, intersecting a line connecting the two objects. Instead of or in addition to such visual notification, a sound and/or a vibration may be used to perform the notification.

In this way, when the state in which the three-dimensional object OB1 is located between the real objects such as the fingers is continuously detected for a longer period of time than a predetermined time, the mobile phone 1 determines that the three-dimensional object OB1 has been selected. An operation such that the fingers are placed so as to sandwich the three-dimensional object OB1 therebetween is similar to a one's operation of pinching an object in order to select a real object. Therefore, such an operation is intuitive and easy to understand as an operation for selecting the three-dimensional object. Moreover, by adding the continuous detection of the state for the longer period of time than the predetermined time to the condition, the user can be prevented from selecting an unintended three-dimensional object during the process of moving the fingers in order to select any other three-dimensional object.

The objects used to operate the three-dimensional object are not limited to the fingers, and therefore may be hands, feet, sticks, setting pins, or so. Even when the two objects are not parallel to the display surface of the touch panel 32, that is, even when the line connecting the two objects intersects the display surface of the touch panel 32 or intersects a horizontal plane parallel to the display surface thereof, the mobile phone 1 sets the three-dimensional object to be in the selected state based on the condition. In this way, the three-dimensional determination as to whether the three-dimensional object has been selected makes it easy to perform the selection operation matching the shape of the three-dimensional object.

To three-dimensionally determine whether the three-dimensional object has been selected, a plurality of imaging units are desirably prepared to capture the finger F1, the finger F2, and so on from different directions so that an obstacle will not cause a blind spot.

After it is determined that the three-dimensional object OB1 is in the selected state, the mobile phone 1 makes a change such as movement, deformation, or deletion to the three-dimensional object OB1 according to the moves of the finger F1 and the finger F2.

Figure 27:
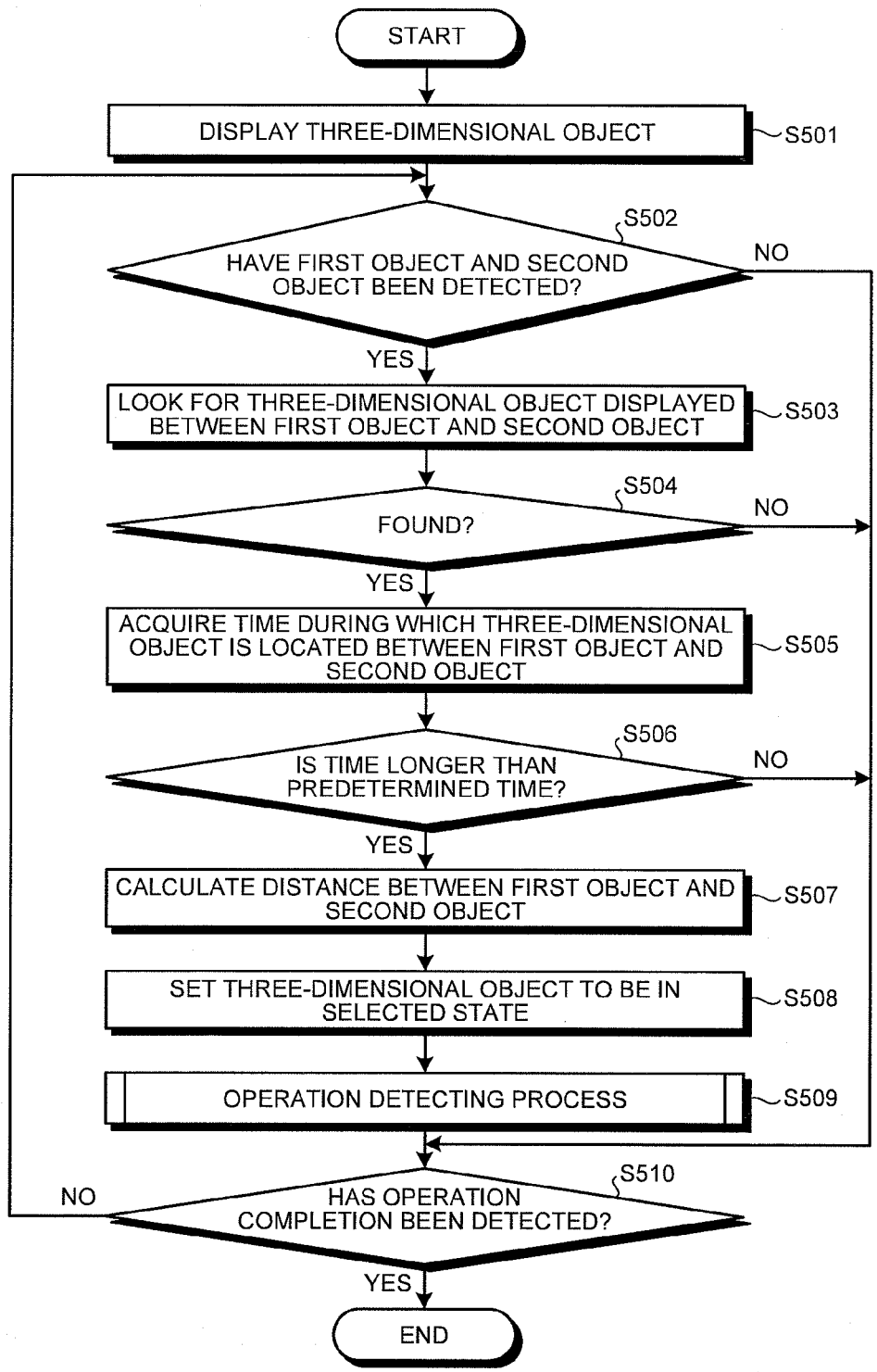
FIG. 27 is a flowchart of a procedure for a selection detecting process in the operation performed with the three-dimensional object pinched.

Then a procedure for an operation performed with a three-dimensional object pinched executed by the mobile phone 1 will be explained with reference to FIG. 27 and FIG. 28. FIG. 27 is a flowchart of a procedure for a selection detecting process in the operation performed with the three-dimensional object pinched. The procedure illustrated in FIG. 27 is implemented by the control unit 22 executing the control program 24a triggered by, for example, detection of a predetermined operation.

As illustrated in FIG. 27, first of all, at Step S501, the control unit 22 stereoscopically displays a three-dimensional object. The data used to display the three-dimensional object may be previously stored in the storage unit 24 or may be acquired from any other device such as a server through communication by the communication unit 26.

Subsequently, at Step S502, the control unit 22 determines whether the detector, that is, the imaging unit 40 or the imaging unit 42 has detected a first object and a second object. The first object and the second object are, for example, user's fingers. When the first object and the second object have not been detected (No at Step S502), then at Step S510, the control unit 22 determines whether operation completion has been detected.

The operation completion may be detected, for example, when a predetermined operation is performed for the operating unit 13 or when a predetermined operation is performed for the touch panel 32 or the touch panel 34. The operation completion may also be detected when a predetermined user's hand gesture is captured by the imaging unit 40 or the imaging unit 42. When the operation completion has been detected (Yes at Step S510), the control unit 22 ends the selection detecting process. When the operation completion has not been detected (No at Step S510), the control unit 22 re-executes Step S502 and the subsequent steps.

When the first object and the second object have been detected (Yes at Step S502), then at Step S503, the control unit 22 looks for a three-dimensional object displayed between the first object and the second object from among displayed three-dimensional objects. When there is no corresponding three-dimensional object (No at Step S504), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When a three-dimensional object displayed between the first object and the second object has been found (Yes at Step S504), then at Step S505, the control unit 22 acquires a time during which the three-dimensional object is located between the first object and the second object. When the acquired time is not longer than a predetermined time (No at Step S506), then at Step S510, the control unit 22 determines whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

When the acquired time is longer than the predetermined time (Yes at Step S506), then at Step S507, the control unit 22 calculates a distance between the first object and the second object. At Step S508, the control unit 22 sets the three-dimensional object displayed between the first object and the second object to be in the selected state. At Step S509, the control unit 22 executes an operation detecting process explained later, and changes, during its execution, the three-dimensional object in the selected state according to the detected operation. After the end of the operation detecting process, the control unit 22 determines at Step S510 whether the operation completion has been detected. When the operation completion has been detected (Yes at Step S510), the control unit 22 ends the selection detecting process. When the operation completion has not been detected (No at Step S510), the control unit 22 re-executes Step S502 and the subsequent steps.

Figure 28:
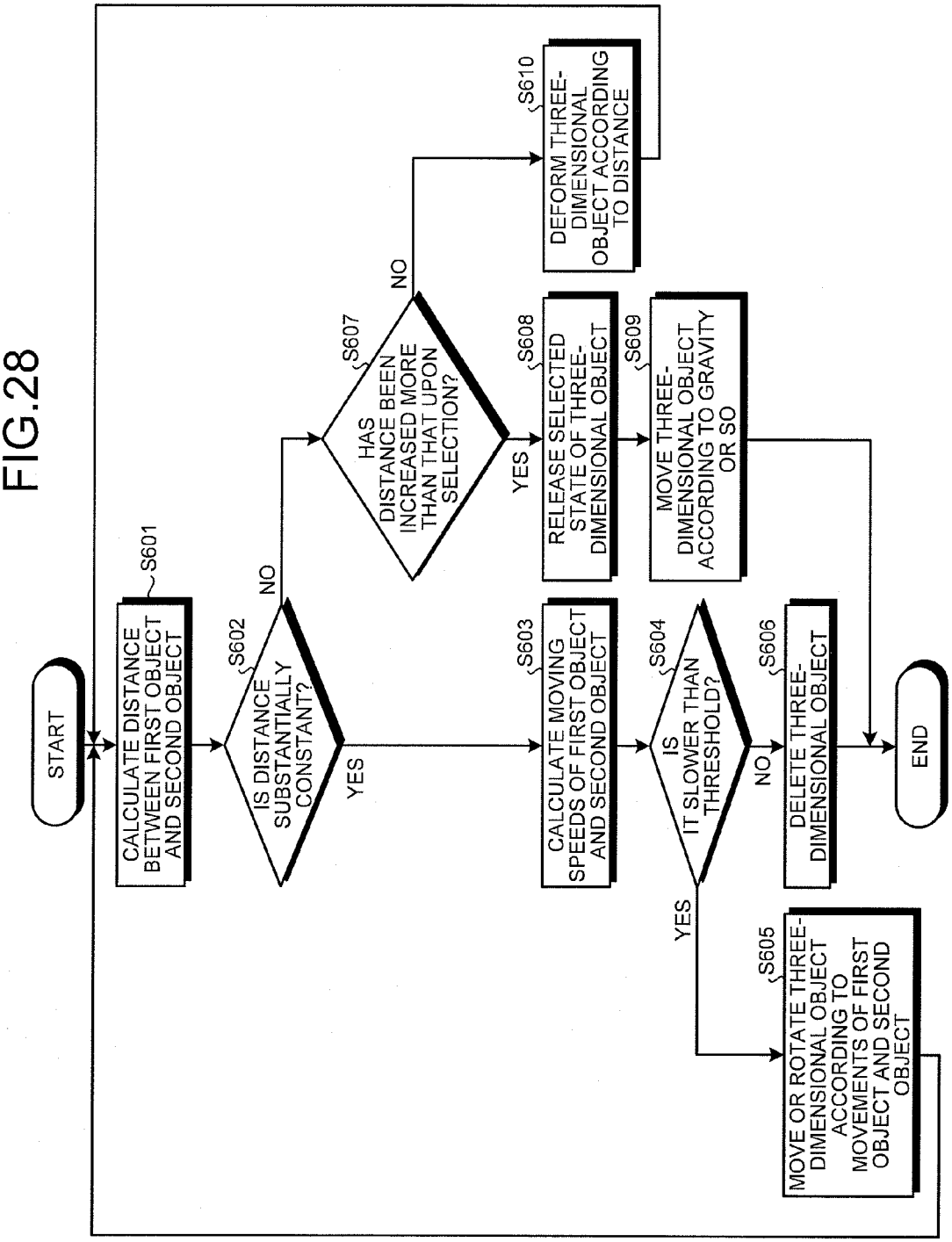
FIG. 28 is a flowchart of a procedure for an operation detecting process in the operation performed with the three-dimensional object pinched.

FIG. 28 is a flowchart of a procedure for an operation detecting process in the operation performed with the three-dimensional object pinched. The procedure illustrated in FIG. 28 is implemented by the control unit 22 executing the control program 24a.

As illustrated in FIG. 28, first of all, at Step S601, the control unit 22 calculates a distance between the first object and the second object. Then at Step S602, the control unit 22 determines whether the distance between the first object and the second object after the operation detecting process is started is substantially constant. The distance being substantially constant means that, for example, a change amount of the distance between the first object and the second object at a current time point falls within a predetermined range (which is ±10% or so of a maximum change amount of the distance when the first object and the second object move at a normal speed), as compared with the distance at the time of starting the operation detecting process. When the distance between the first object and the second object is continuously reduced after the start of the operation detecting process (when the first object and the second object are moving in a direction of crushing the three-dimensional object), it may be determined that the distance is substantially constant. Alternatively, when the distance between the two objects changes only within a range due to the shaky movement of the hand, it may be determined that the distance is substantially constant.

When the distance between the first object and the second object is substantially constant (Yes at Step S602), then at Step S603, the control unit 22 calculates moving speeds of the first object and the second object. Subsequently, at Step S604, the control unit 22 determines whether each of the calculated moving speeds is slower than a threshold. The threshold used here is, for example, a moving speed of fingertips when one throws something. The moving speed compared with the threshold may be an average of the moving speed of the first object and the moving speed of the second object, or may be a higher one of them, or may be a lower one of them.

When the moving speed is slower than the threshold (Yes at Step S604), then at Step S605, the control unit 22 moves or rotates the three-dimensional object according to detected moves of the first object and the second object. For example, when it is detected that the first object and the second object have moved rightward, the control unit 22 moves the three-dimensional object rightward according to the movements of the first object and the second object. When it is detected that the first object and the second object have rotated counter-clockwise, the control unit 22 rotates the three-dimensional object counterclockwise according to the rotation of the first object and the second object. When the movement and the rotation are simultaneously detected, the movement and the rotation of the three-dimensional object are simultaneously executed. If there is an obstacle against the movement and/or the rotation of the three-dimensional object, the movement and/or the rotation of the three-dimensional object may be stopped when the three-dimensional object comes in contact with the obstacle. The control unit 22 then re-executes Step S601 and the subsequent steps.

When the moving speed is higher than the threshold (No at Step S604), then at Step S606, the control unit 22 deletes the three-dimensional object. When the three-dimensional object is to be deleted, animation display may be used as if the three-dimensional object flies toward a moving direction of the first object and the second object. The control unit 22 then ends the operation detecting process. In this way, when the first object and the second object move at a high speed as if they throw the three-dimensional object, the three-dimensional object is deleted, and the deletion of the three-dimensional object can thereby be implemented with an intuitive operation. The deletion of the three-dimensional object may be assigned to, for example, the operation of crushing the three-dimensional object instead of the operation for moving the first object and the second object at a high speed. Instead of deleting the three-dimensional object, the three-dimensional object may be returned to its initial position.

When the distance between the first object and the second object is not substantially constant (No at Step S602), then at Step S607, the control unit 22 determines whether the distance has been increased more than that upon the selection of the three-dimensional object, that is, upon the start of the operation detecting process. When the distance has been increased (Yes at Step S607), then at Step S608, the control unit 22 releases the selected state of the three-dimensional object. The operation of increasing the distance between the first object and the second object is similar to an operation of releasing a real object pinched. Therefore, such an operation is intuitive and easy to understand as an operation for releasing the selection of the three-dimensional object.

Subsequently, at Step S609, the control unit 22 moves the three-dimensional object, whose selected state has been released, according to gravity or so. The control unit 22 then ends the operation detecting process. The movement in this case is displayed so that the three-dimensional object falls according to gravity and stops on a floor or a table. Before the move of the three-dimensional object is stopped, the three-dimensional object may be bounded according to the elasticity of the three-dimensional object or according to the hardness of the floor or the table. The magnitude of impact produced when the three-dimensional object bumps against the floor or the table may be calculated, and if the impact is greater than a predetermined value, then the three-dimensional object may be displayed as if it is broken. The three-dimensional object may be moved more slowly than a case where actual gravity works on it.

When the distance between the first object and the second object has been reduced more than that upon the selection of the three-dimensional object (No at Step S607), then at Step S610, the control unit 22 deforms the three-dimensional object according to the distance. The control unit 22 then re-executes Step S601 and the subsequent steps. The degree of deformation of the three-dimensional object may be changed according to, for example, the elasticity set as an attribute to the three-dimensional object. For an object whose hardness is set to be low as an attribute like a three-dimensional object resembling a rubber ball, the control unit 22 may increase the degree of deformation according to how the distance between the first object and the second object is reduced. For an object whose hardness is set to be high as an attribute like a three-dimensional object resembling blocks, the control unit 22 may keep low the degree of deformation even if the distance between the first object and the second object is reduced.

When the distance between the first object and the second object is reduced more than that upon the selection of the three-dimensional object, the three-dimensional object may be reduced instead of being deformed. When the distance between the first object and the second object becomes shorter than the predetermined value, the three-dimensional object may be displayed as if it is broken.

When an operation performed for the three-dimensional object is detected based on the procedures illustrated in FIG. 27 and FIG. 28, a threshold used to determine the validity of operations, when the operations conflict with each other, may be set to the length longer than the predetermined time which is used at Step S506. By setting the threshold in this manner, it is possible to reduce the possibility that an operation performed for the three-dimensional object may be determined as invalid caused by any other action than the operation performed for the three-dimensional object.

Figure 29:
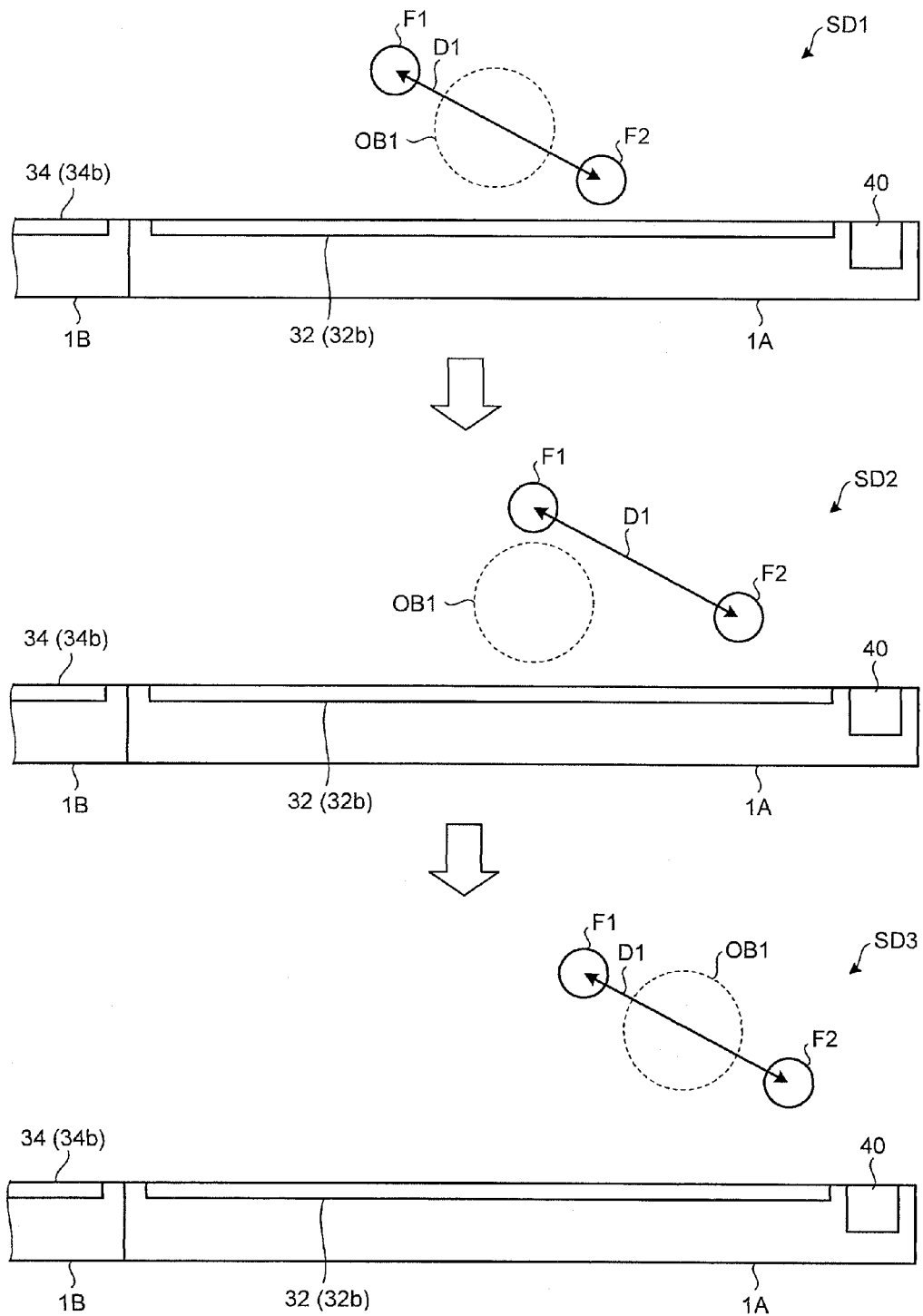
FIG. 29 is a diagram for explaining a first modification of a detection method for an operation performed with the three-dimensional object pinched.

The detection method for an operation performed with a three-dimensional object pinched is not limited to the method. FIG. 29 is a diagram for explaining a first modification of the detection method for an operation performed with the three-dimensional object pinched. At Step SD1 in FIG. 29, the touch panel 32 stereoscopically displays the three-dimensional object OB1 in the three-dimensional space on the first housing 1A side. To select the three-dimensional object OB1, the user moves the finger F1 and the finger F2 so that the three-dimensional object OB1 is located between the finger F1 and the finger F2.

When two objects are detected within the three-dimensional space and the three-dimensional object OB1 is located between the two objects, the mobile phone 1 monitors a change in the distance between the two objects. When the distance is substantially constant for the longer period of time than the predetermined time, the mobile phone 1 determines that the three-dimensional object OB1 has been selected, and sets the three-dimensional object OB1 to be in the selected state. The mobile phone 1 then, for example, changes the display mode of the three-dimensional object OB1 to notify the user that the three-dimensional object OB1 is in the selected state.

There is no need for the two objects to remain in positions where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step SD1, and thereafter the user may move the finger F1 and the finger F2 to some other positions without maintaining the state.

It is assumed, as illustrated at Step SD2, that the user moves the finger F1 and the finger F2 from the state of Step SD1 while a distance D1 between the finger F1 and the finger F2 is maintained substantially constant. In this case, as illustrated at Step SD3, the mobile phone 1 sets the three-dimensional object OB1 to be in the selected state at the stage when the state in which the distance D1 between the finger F1 and the finger F2 is maintained substantially constant continues for the longer period of time than the predetermined time. The mobile phone 1 then moves the three-dimensional object OB1 into position between the finger F1 and the finger F2 as if it is already selected at the stage of Step SD1. The moves of the finger F1 and the finger F2 from Step SD1 to Step SD3 are stored, and the three-dimensional object OB1 may be, for example, rotated according to the stored moves. Thereafter, the mobile phone 1 makes a change such as movement, deformation, or deletion to the three-dimensional object OB1 according to the moves of the finger F1 and the finger F2.

In this way, after the two objects are moved once to the positions where the three-dimensional object OB1 is sandwiched therebetween, by setting the three-dimensional object so as to be selectable even if the objects do not remain in the positions, the user can quickly start the operation after the three-dimensional object is selected.

Figure 30:
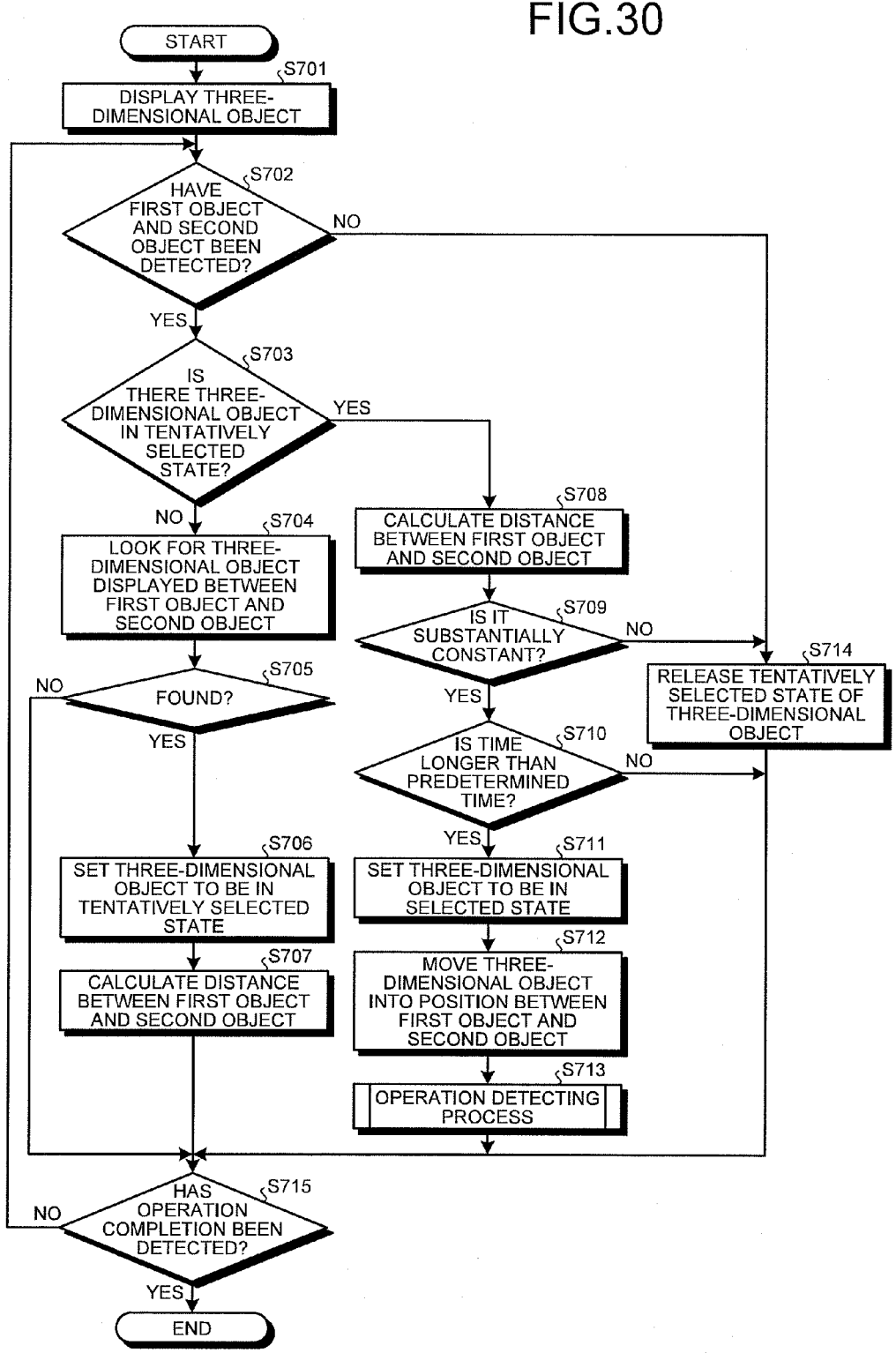
FIG. 30 is a flowchart of a procedure for a selection detecting process according to the first modification of the detection method for the operation performed with the three-dimensional object pinched.

FIG. 30 is a flowchart of a procedure for a selection detecting process according to the first modification of the detection method for the operation performed with the three-dimensional object pinched. The procedure illustrated in FIG. 30 is implemented by the control unit 22 executing the control program 24a triggered by, for example, detection of a predetermined operation.

As illustrated in FIG. 30, first of all, at Step S701, the control unit 22 stereoscopically displays the three-dimensional object. Subsequently, at Step S702, the control unit 22 determines whether the detectors, that is, the imaging units 40a and 40b or the imaging units 42a and 42b have detected the first object and the second object. When the first object and the second object have not been detected (No at Step S702), then at Step S714, the control unit 22 releases, if there is a three-dimensional object in a tentatively selected state, the tentatively selected state of the three-dimensional object. The tentatively selected state represents a state in which the display of the three-dimensional object between the two objects is detected and thereafter it is monitored whether the distance between the two objects is maintained substantially constant.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected (Yes at Step S702), then at Step S703, the control unit 22 determines whether there is a three-dimensional object in the tentatively selected state. When there is no three-dimensional object in the tentatively selected state (No at Step S703), then at Step S704, the control unit 22 looks for a three-dimensional object displayed between the first object and the second object from among displayed three-dimensional objects.

When there is no corresponding three-dimensional object (No at Step S705), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When a three-dimensional object displayed between the first object and the second object has been found (Yes at Step S705), then at Step S706, the control unit 22 sets the three-dimensional object displayed between the first object and the second object to be in the tentatively selected state. The control unit 22 calculates, at Step S707, a distance between the first object and the second object.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the first object and the second object have been detected and there is a three-dimensional object in the tentatively selected state (Yes at Step S703), then at Step S708, the control unit 22 calculates a distance between the first object and the second object. The control unit 22 determines at Step S709 whether the distance is substantially constant. When the distance is not substantially constant (No at Step S709), then at Step S714, the control unit 22 releases the tentatively selected state of the three-dimensional object in the tentatively selected state.

The control unit 22 then determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the distance between the first object and the second object is substantially constant (Yes at Step S709), then at Step S710, the control unit 22 determines whether a time during which the distance is maintained substantially constant is longer than a predetermined time. When the time during which the distance is maintained substantially constant is not longer than the predetermined time (No at Step S710), then at Step S715, the control unit 22 determines whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When the time during which the distance is maintained substantially constant is longer than the predetermined time (Yes at Step S710), then at Step S711, the control unit 22 sets the three-dimensional object displayed between the first object and the second object to be in the selected state. At Step S712, the control unit 22 moves the three-dimensional object OB1 into position between the first object and the second object. Then at Step S713, the control unit 22 executes the operation detecting process illustrated in FIG. 28, and changes, during its execution, the three-dimensional object in the selected state according to the detected operation.

After the end of the operation detecting process, the control unit 22 determines at Step S715 whether the operation completion has been detected. When the operation completion has been detected (Yes at Step S715), the control unit 22 ends the selection detecting process. When the operation completion has not been detected (No at Step S715), the control unit 22 re-executes Step S702 and the subsequent steps.

When an operation performed for the three-dimensional object is detected based on the first modification, a threshold used to determine the validity of operations, when the operations conflict with each other, may be set to the length longer than the predetermined time which is used at Step S710. By setting the threshold in this manner, it is possible to reduce the possibility that an operation performed for the three-dimensional object may be determined as invalid caused by any other action than the operation performed for the three-dimensional object.

Figure 31:
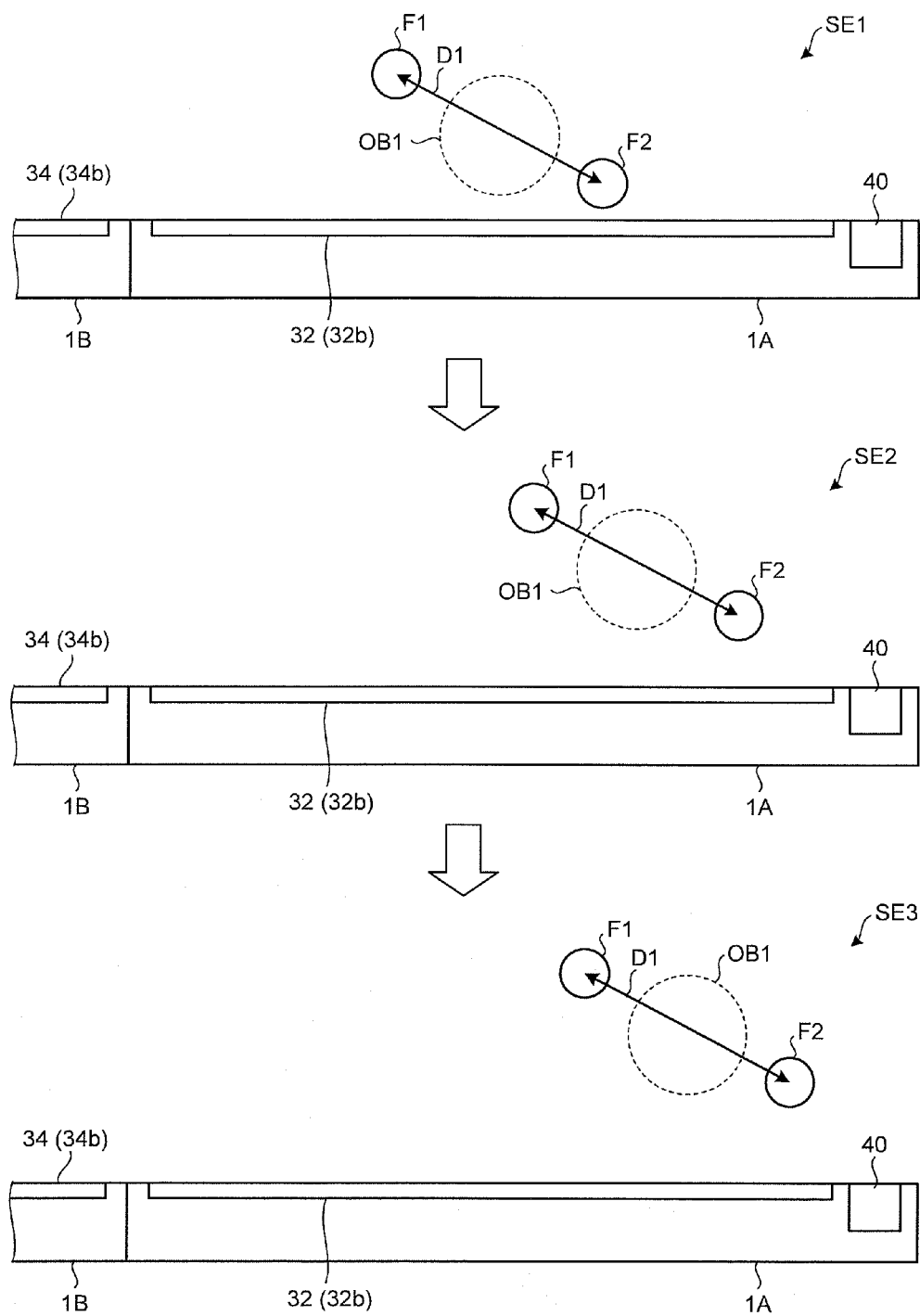
FIG. 31 is a diagram for explaining a second modification of the detection method for the operation performed with the three-dimensional object pinched.
Figure 32:
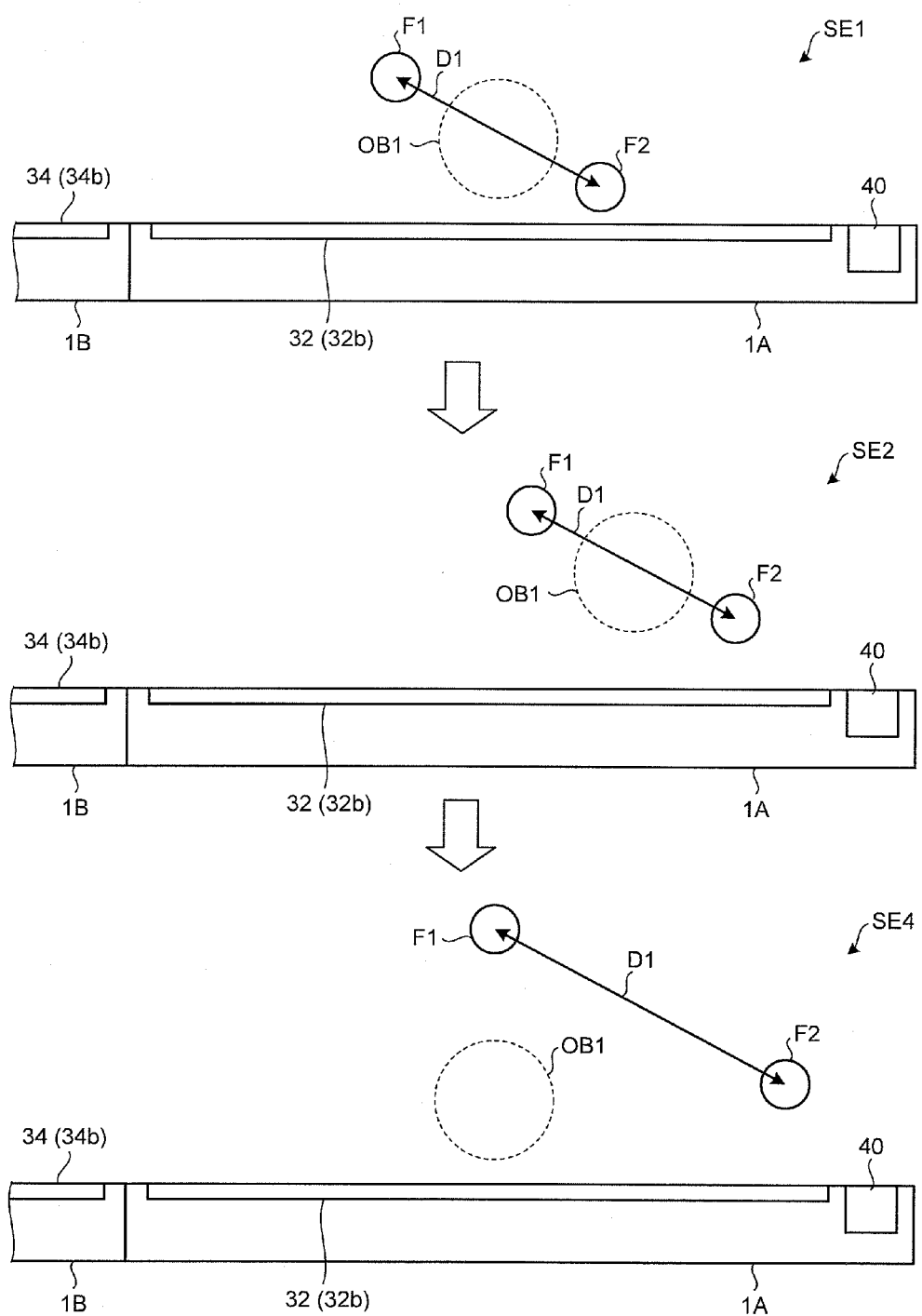
FIG. 32 is a diagram for explaining the second modification of the detection method for the operation performed with the three-dimensional object pinched.

FIG. 31 and FIG. 32 are diagrams for explaining a second modification of the detection method for the operation performed with the three-dimensional object pinched. At Step SE1 in FIG. 31, the touch panel 32 stereoscopically displays the three-dimensional object OB1 in the three-dimensional space. To select the three-dimensional object OB1, the user moves the finger F1 and the finger F2 so that the three-dimensional object OB1 is located between the finger F1 and the finger F2.

When two objects are detected within the three-dimensional space and the three-dimensional object OB1 is located between the two objects, the mobile phone 1 monitors a change in a distance between the two objects. When the distance is substantially constant for the longer period of time than the predetermined time, the mobile phone 1 determines that the three-dimensional object OB1 has been selected, and sets the three-dimensional object OB1 to be in the selected state. The mobile phone 1 then, for example, changes the display mode of the three-dimensional object OB1 to notify the user that the three-dimensional object OB1 is in the selected state.

There is no need for the two objects to remain in positions where the three-dimensional object OB1 is sandwiched therebetween while the mobile phone 1 is monitoring the change in the distance between the two objects. Namely, the user moves the finger F1 and the finger F2 so that the three-dimensional object OB1 is located between the finger F1 and the finger F2 as illustrated at Step SE1, and thereafter the user may move the finger F1 and the finger F2 to some other positions without maintaining the state.

It is assumed, as illustrated at Step SE2, that the user moves the finger F1 and the finger F2 from the state of Step SE1 while maintaining the distance D1 between the finger F1 and the finger F2 substantially constant. In this case, the mobile phone 1 makes a change such as movement, deformation, or deletion to the three-dimensional object OB1 according to the moves of the finger F1 and the finger F2 from the stage when the three-dimensional object OB1 displayed between the finger F1 and the finger F2 is detected, that is, from the stage of Step SE1. Then as illustrated at Step SE3, the mobile phone 1 sets the three-dimensional object OB1 to be in the selected state at the stage when the state in which the distance D1 between the finger F1 and the finger F2 is maintained substantially constant continues for the longer period of time than the predetermined time.

As illustrated at Step SE4 in FIG. 32, when the distance D1 between the finger F1 and the finger F2 is increased before the predetermined time elapses, that is, when the selection is not performed, the mobile phone 1 makes a reverse change to the change made so far to the three-dimensional object OB1. Consequently, the three-dimensional object OB1 is displayed at the same position as that at the stage of Step SE1 in the same state. The speed at which the reverse change is made to the three-dimensional object OB1 may be higher than the speed at which the change is made to the three-dimensional object OB1 so far. Namely, the three-dimensional object OB1 may be reversely changed as if it is reversely reproduced at a high speed.

In this way, by starting making the change to the three-dimensional object from the stage when the three-dimensional object displayed between the two objects is detected, the user can recognize that the three-dimensional object is being selected before the selection is determined. As a result, the user OB1, at an early point, whether an intended three-dimensional object is selected. Until the state in which the distance between the two objects is maintained substantially constant continues for the longer period of time than the predetermined time, the three-dimensional object which is being changed may be displayed in a mode (e.g., half-transparent mode) different from the normal mode or from the mode in the selected state, so that the user can easily determine the state of the three-dimensional object.

Figure 33:
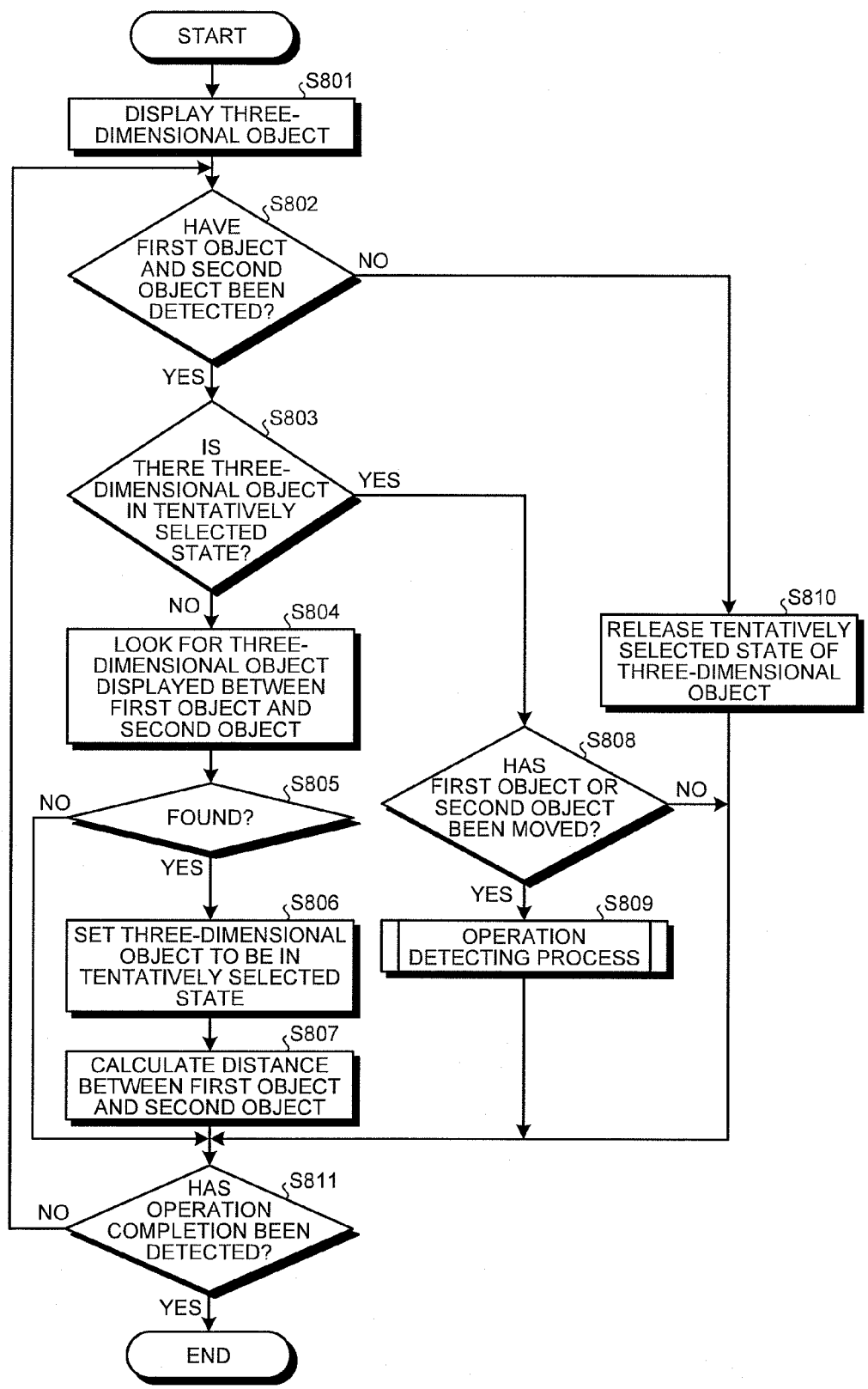
FIG. 33 is a flowchart of a procedure for a selection detecting process according to the second modification of the detection method for the operation performed with the three-dimensional object pinched.

FIG. 33 is a flowchart of a procedure for a selection detecting process according to the second modification of the detection method for the operation performed with the three-dimensional object pinched. The procedure illustrated in FIG. 33 is implemented by the control unit 22 executing the control program 24a triggered by, for example, detection of a predetermined operation.

As illustrated in FIG. 33, first of all, at Step S801, the control unit 22 stereoscopically displays the three-dimensional object. Subsequently, at Step S802, the control unit 22 determines whether the detectors, that is, the imaging units 40a and 40b or the imaging units 42a and 42b have detected the first object and the second object. When the first object and the second object have not been detected (No at Step S802), then at Step S810, the control unit 22 releases, if there is a three-dimensional object in the tentatively selected state, the tentatively selected state of the three-dimensional object.

The control unit 22 then determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected (Yes at Step S802), then at Step S803, the control unit 22 determines whether there is a three-dimensional object in the tentatively selected state. When there is no three-dimensional object in the tentatively selected state (No at Step S803), then at Step S804, the control unit 22 looks for a three-dimensional object displayed between the first object and the second object from among displayed three-dimensional objects.

When there is no corresponding three-dimensional object (No at Step S805), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When a three-dimensional object displayed between the first object and the second object has been found (Yes at Step S805), then at Step S806, the control unit 22 sets the three-dimensional object displayed between the first object and the second object to be in the tentatively selected state. The control unit 22 calculates, at Step S807, a distance between the first object and the second object.

The control unit 22 then determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

When the first object and the second object have been detected and there is a three-dimensional object in the tentatively selected state (Yes at Step S803), then at Step S808, the control unit 22 determines whether at least one of the first object and the second object has been moved. When neither the first object nor the second object has been moved (No at Step S808), then at Step S811, the control unit 22 determines whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

Figure 34:
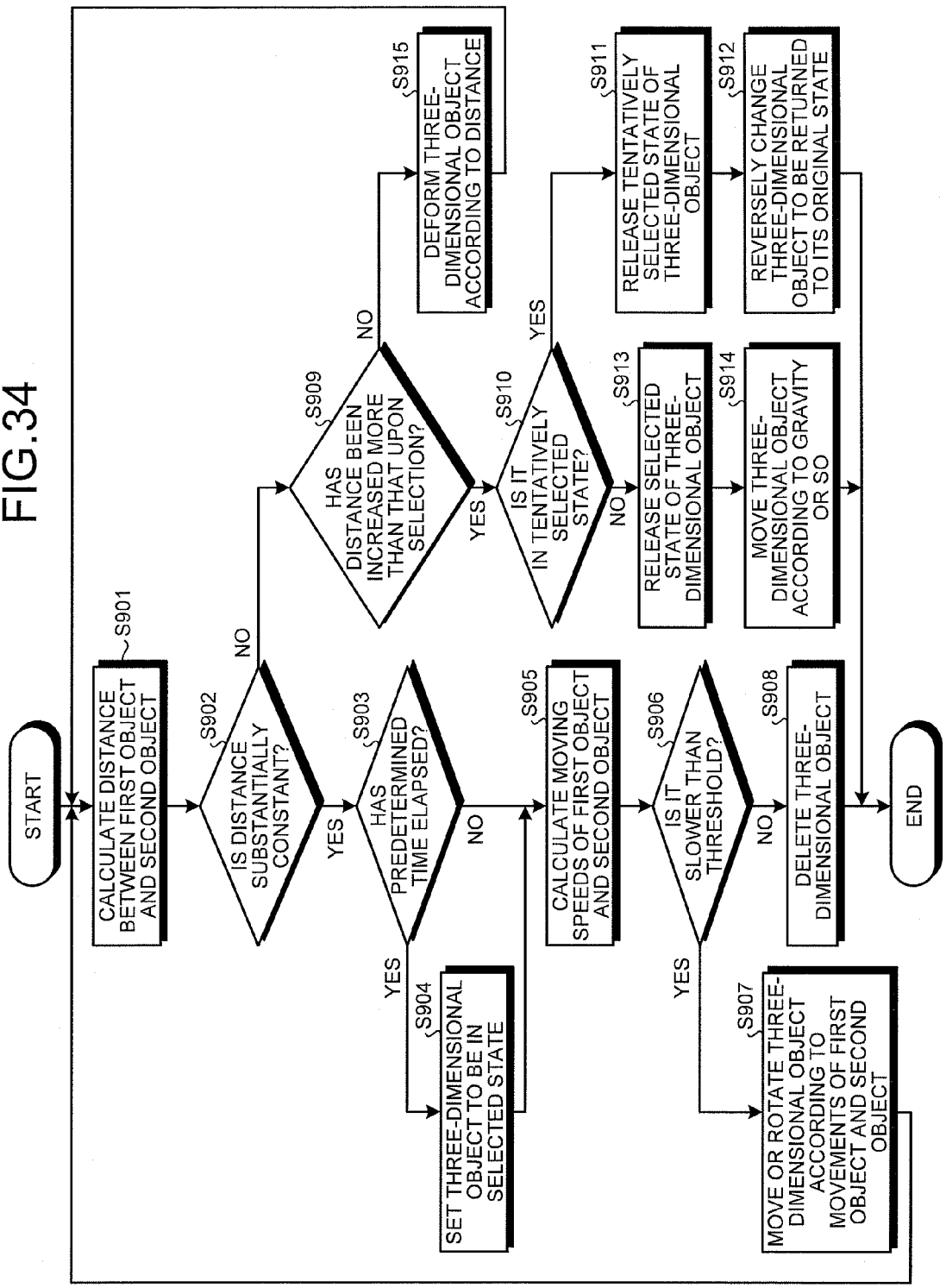
FIG. 34 is a flowchart of a procedure for an operation detecting process according to the second modification of the detection method for the operation performed with the three-dimensional object pinched.

When at least one of the first object and the second object has been moved (Yes at Step S808), then at Step S809, the control unit 22 executes an operation detecting process illustrated in FIG. 34, and changes, during its execution, the three-dimensional object in the selected state according to the detected operation.

After the end of the operation detecting process, the control unit 22 determines at Step S811 whether the operation completion has been detected. When the operation completion has been detected (Yes at Step S811), the control unit 22 ends the selection detecting process. When the operation completion has not been detected (No at Step S811), the control unit 22 re-executes Step S802 and the subsequent steps.

FIG. 34 is a flowchart of a procedure for an operation detecting process according to the second modification of the detection method for the operation performed with the three-dimensional object pinched. The procedure illustrated in FIG. 34 is implemented by the control unit 22 executing the control program 24a. As illustrated in FIG. 34, first of all, at Step S901, the control unit 22 calculates a distance between the first object and the second object. Then at Step S902, the control unit 22 determines whether the distance between the first object and the second object after the start of the operation detecting process is substantially constant.

When the distance between the first object and the second object is substantially constant (Yes at Step S902), then at Step S903, the control unit 22 determines whether a predetermined time has elapsed since the start of the operation detecting process. When the predetermined time has elapsed (Yes at Step S903), then at Step S904, the control unit 22 sets, if there is a three-dimensional object in the tentatively selected state, the three-dimensional object to be in the selected state. When the predetermined time has not elapsed (No at Step S903), the control unit 22 does not execute Step S904.

Subsequently, at Step S905, the control unit 22 calculates moving speeds of the first object and the second object. Then at Step S906, the control unit 22 determines whether each of the calculated moving speeds is slower than a threshold. When the moving speed is slower than the threshold (Yes at Step S906), then at Step S907, the control unit 22 moves or rotates the three-dimensional object according to the detected moves of the first object and second object. The control unit 22 then re-executes Step S901 and the subsequent steps.

When the moving speed is not slower than the threshold (No at Step S906), then at Step S908, the control unit 22 deletes the three-dimensional object. When the three-dimensional object is to be deleted, animation display may be used as if the three-dimensional object flies toward a moving direction of the first object and the second object. The control unit 22 then ends the operation detecting process. The deletion of the three-dimensional object may be assigned to, for example, the operation of crushing the three-dimensional object instead of the operation for moving the first object and the second object at a high speed. Instead of deleting the three-dimensional object, the three-dimensional object may be returned to its initial position.

When the distance between the first object and the second object is not substantially constant (No at Step S902), then at Step S909, the control unit 22 determines whether the distance has been increased more than that upon the selection of the three-dimensional object, that is, upon the start of the operation detecting process. When the distance has been increased (Yes at Step S909), then at Step S910, the control unit 22 determines whether the three-dimensional object displayed between the first object and the second object is in the tentatively selected state.

When the three-dimensional object is in the tentatively selected state (Yes at Step S910), then at Step S911, the control unit 22 releases the tentatively selected state of the three-dimensional object. At Step S912, the control unit 22 reversely changes the three-dimensional object to be returned to its original state. The control unit 22 then ends the operation detecting process.

When the three-dimensional object is not in the tentatively selected state, that is, is in the selected state (No at Step S910), then at Step S913, the control unit 22 releases the selected state of the three-dimensional object. At Step S914, the control unit 22 moves the three-dimensional object, whose selected state has been released, according to gravity or so. The control unit 22 then ends the operation detecting process. The movement in this case is displayed so that the three-dimensional object falls according to gravity and stops on a floor or a table. Before the movement of the three-dimensional object is stopped, the three-dimensional object may be bounded according to the elasticity of the three-dimensional object or according to the hardness of the floor or the table. The magnitude of impact produced when the three-dimensional object bumps against the floor or the table is calculated, and the impact is greater than a predetermined value, then the three-dimensional object may be displayed as if it is broken. Moreover, the three-dimensional object may be moved more slowly than a case where actual gravity works on it.

When the distance between the first object and the second object has been reduced more than that upon the selection of the three-dimensional object (No at Step S909), then at Step S915, the control unit 22 deforms the three-dimensional object according to the distance. The control unit 22 then re-executes Step S901 and the subsequent steps. The degree of deformation of the three-dimensional object may be changed according to, for example, the hardness set as an attribute to the three-dimensional object.

When an operation performed for the three-dimensional object is detected based on the second modification, a threshold used to determine the validity of operations, when the operations conflict with each other, may be set to the length longer than the predetermined time which is used at Step S903. By setting the threshold in this manner, it is possible to reduce the possibility that an operation performed for the three-dimensional object may be determined as invalid caused by any other action than the operation performed for the three-dimensional object.

A second embodiment will be explained below. The embodiment is configured to detect the objects for operating the three-dimensional object based on the images captured by the imaging units; however, some other detection methods may be used. For example, a capacitive type touch sensor can detect a position where a finger does not make contact with the touch sensor by increasing the sensitivity. Therefore, the second embodiment represents an example of using the touch sensor as a detector that detects objects for operating a three-dimensional object. In the following explanation, the same signs as the already explained components are assigned to the same components as the already explained components. Explanation that overlaps with the above explanation may be omitted.

Figure 35:
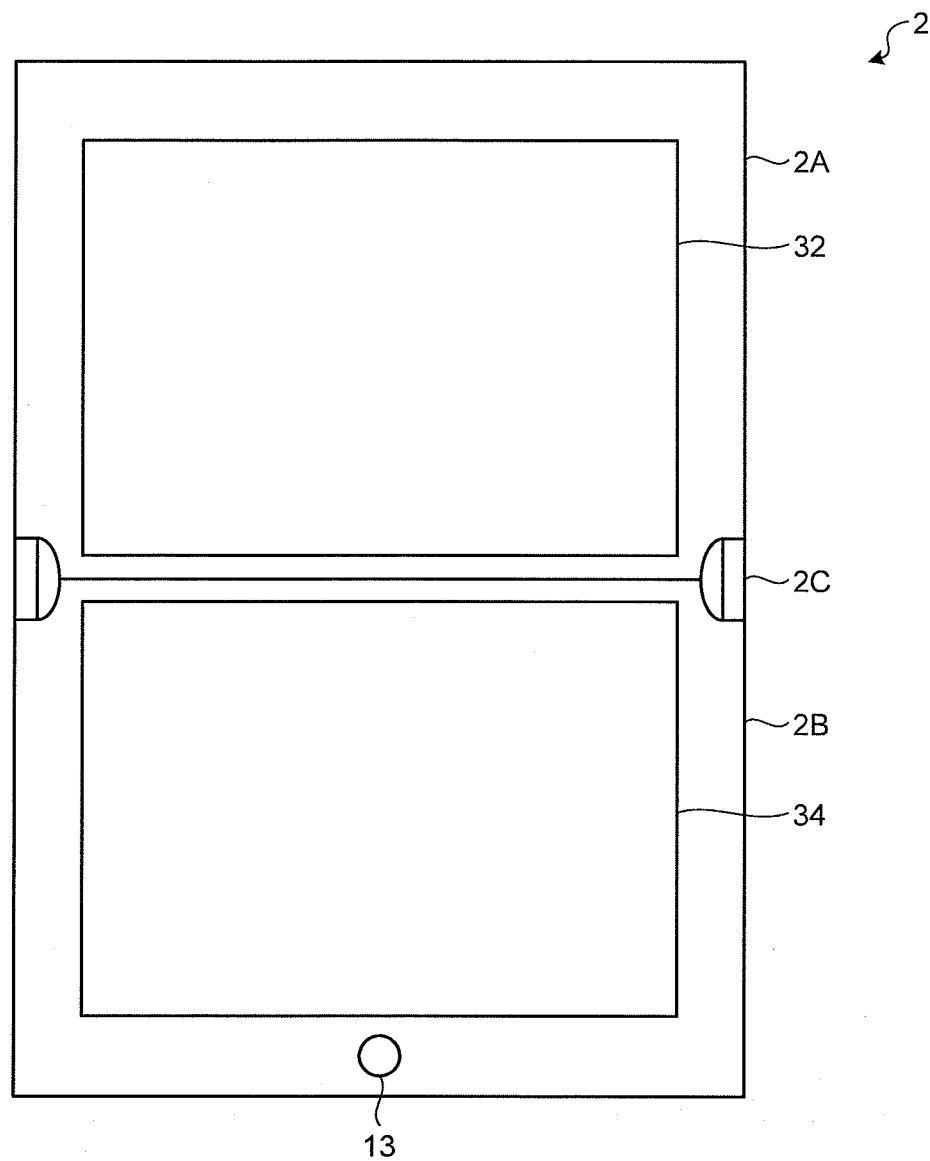
FIG. 35 is a front view of a mobile phone according to a second embodiment.
Figure 36:
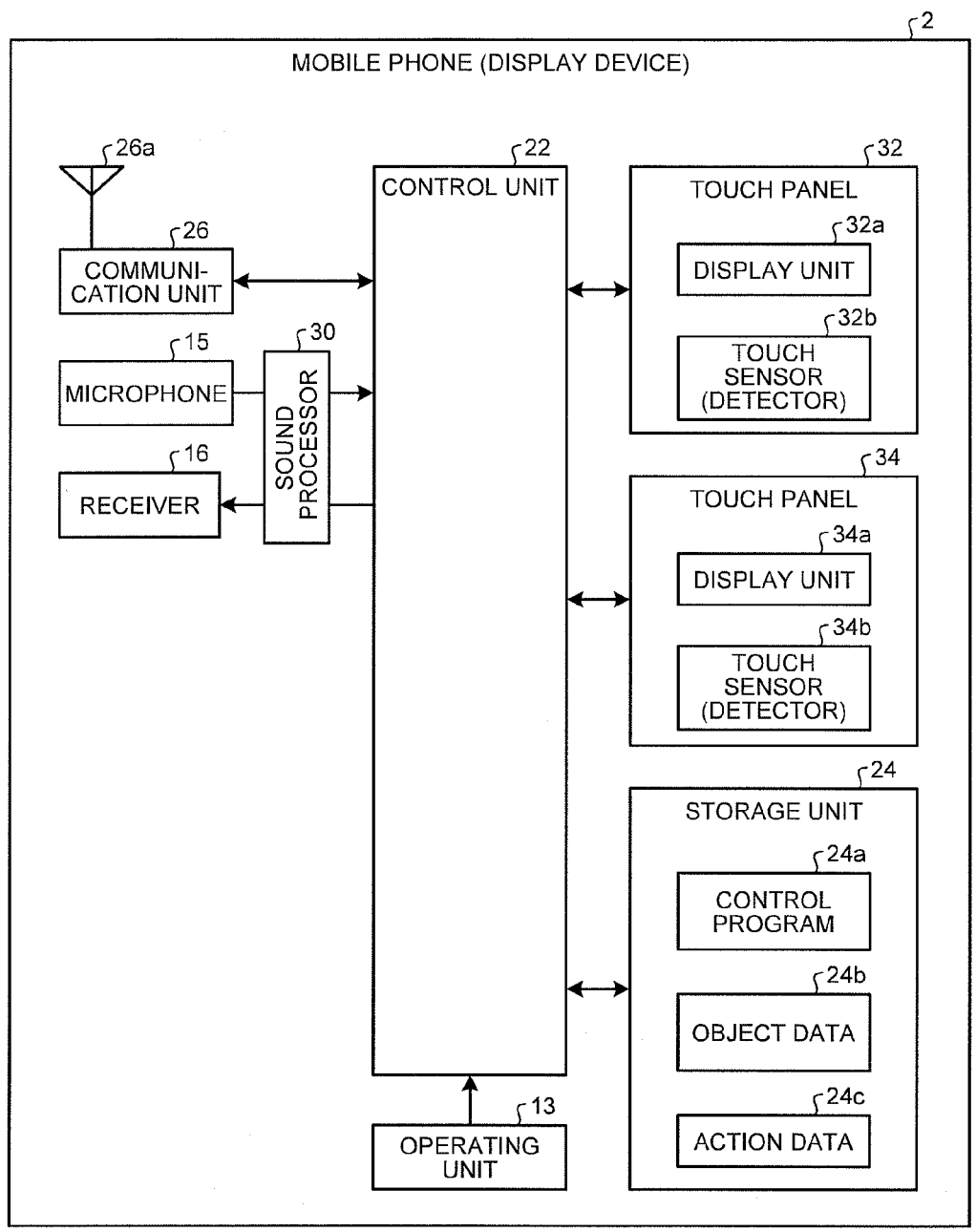
FIG. 36 is a block diagram of the mobile phone according to the second embodiment.

First of all, a configuration of a mobile phone (display device) 2 according to the second embodiment will be explained below with reference to FIG. 35 and FIG. 36. FIG. 35 is a front view of the mobile phone 2. FIG. 36 is a block diagram of the mobile phone 2.

As illustrated in FIG. 35, the mobile phone 2 includes a first housing 2A, a second housing 2B, and a hinge 2C. The first housing 2A includes the touch panel 32 on one of its faces. The second housing 2B includes the touch panel 34 on one of its faces. The hinge 2C relatively pivotably connects the first housing 2A and the second housing 2B.

In the open state of the mobile phone 2 illustrated in FIG. 35, the touch panel 32 provided in the first housing 2A and the touch panel 34 provided in the second housing 2B form a substantially continuous flat plane. The first housing 2A is pivoted by about 180 degrees around the hinge 2C as a rotation axis, so that the mobile phone 2 is deformed from the open state illustrated in FIG. 35 to the closed state similarly to that of the mobile phone 1 illustrated in FIG. 3. The closed state makes the touch panel 32 and the touch panel 34 invisible from the outside.

As illustrated in FIG. 36, the mobile phone 2 includes the operating unit 13, the microphone 15, the receiver 16, the control unit 22, the storage unit 24, the communication unit 26, the sound processor 30, the touch panel 32, and the touch panel 34.

The touch panel 32 includes the display unit 32a and the touch sensor 32b. The touch panel 34 includes the display unit 34a and the touch sensor 34b. In the present embodiment, the touch sensor 32b and the touch sensor 34b are a capacitive type touch sensor. The touch sensor 32b and the touch sensor 34b function also as detectors that detect objects such as fingers operating a three-dimensional object.

Figure 37:
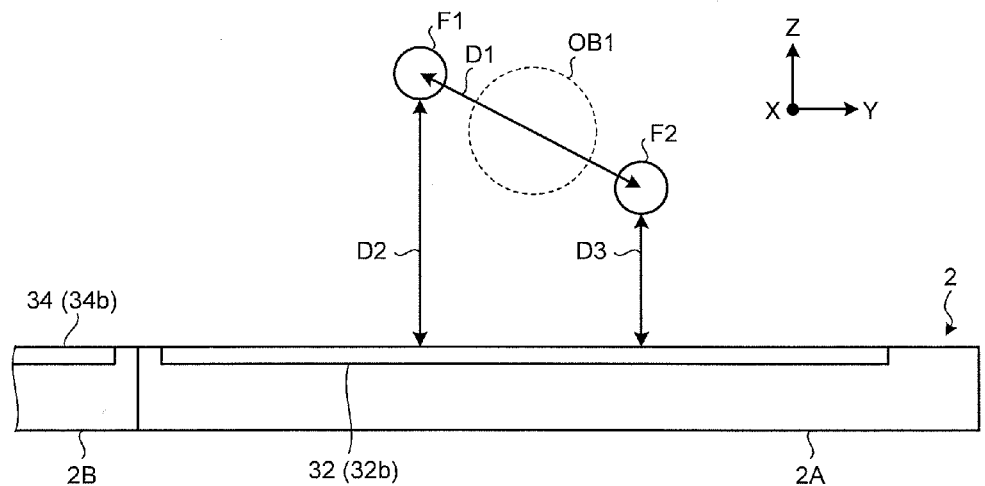
FIG. 37 is a diagram for explaining detection of an operation performed for the three-dimensional object according to the second embodiment.

Then detection of an operation performed for a three-dimensional object will be explained with reference to FIG. 37. FIG. 37 is a diagram for explaining detection of an operation performed for the three-dimensional object according to the second embodiment. As illustrated in FIG. 37, the three-dimensional object OB1 is displayed in the three-dimensional space on the first housing 2A side. Moreover, as illustrated in FIG. 37, the user is about to make contact with the three-dimensional object OB1 with the finger F1.

In this way, when the finger F1 is in the three-dimensional space on the first housing 2A side, the mobile phone 2 detects the position of the finger F1 using the touch sensor 32b. The touch sensor 32b can detect a position of the finger F1 in an X-axis direction and a Y-axis direction by increasing its sensitivity even if, for example, a distance from the finger F1 to the surface of the touch sensor 32b in a Z-axis direction is about 10 cm. The touch sensor 32b can detect a distance D2 from the finger F1 to the surface of the touch sensor 32b in the Z-axis direction based on the magnitude of the capacitance.

Based on the thus detected position of the finger F1 in the three-dimensional space, the mobile phone 2 can detect the contact between the finger F1 and the three-dimensional object OB1 and detect an operation of pushing the three-dimensional object OB1 with the finger F1 and an operation of holding it therewith. Likewise, when the three-dimensional object is displayed in the three-dimensional space on the second housing 2B side and the finger F1 is in the three-dimensional space on the second housing 2B side, the mobile phone 2 can detect an operation of the finger F1 performed for the three-dimensional object using the touch sensor 34b.

As explained above, the second embodiment is configured to use the touch sensors as detectors, and therefore an operation performed for the three-dimensional object can be detected even by a display device without the imaging units.

To detect an operation performed for the three-dimensional object, the imaging units and the touch sensors may be used in combination with each other. When the imaging units are combined with the touch sensors, respective detection results may be averaged to specify the position of the finger F1. The imaging unit is difficult to capture an image of the finger F1 in an area near the touch sensor, and a detection precision of the touch sensor becomes low in an area far from the touch sensor. Therefore, a weighted average may be used to solve the problem, the weighted average being obtained by increasing weighting of the detection result of the touch sensor in the area near the touch sensor and by increasing weighting of the detection result of the imaging unit in the area far from the touch sensor.

To prevent the touch sensor from not detecting a position of a finger with high precision because the other finger or so may block the finger, a plurality of touch sensors may be used to detect an operation performed for the three-dimensional object.

The aspects of the present invention represented in the embodiments can be arbitrarily modified without departing from the gist of the present invention. For example, the control program 24a represented in the embodiments may be divided into a plurality of modules or may be integrated with any other program. In the embodiments, the finger is used to operate the three-dimensional object; however, a stick-like object or so of which end is charged with static electricity may be used instead of the finger.

The embodiments represent the examples of using the imaging units and/or the touch sensors as the detectors in order to detect the three-dimensional object; however, the detector is not limited thereto. For example, a sensor using a Time-of-Flight (TOF) method may be used instead of the imaging unit. In addition, when a proximity sensor or the like capable of detecting a movement of the three-dimensional object in a planar direction of the three-dimensional space is disposed substantially horizontally with respect to a moving direction of the object, displacement of the object can be detected even in a non-contact manner, and therefore these devices may also be used. The displacement of the object may be detected without providing the sensor or so in the object. If the sensor or so is not provided in the object and there is therefore no need to attach an acceleration sensor to the finger or to move a display device itself with an acceleration sensor, then this leads to cost reduction.

The embodiments are configured that the display device singly detects an operation performed for the three-dimensional object; however, the display device may collaborate with a server to detect an operation performed for the three-dimensional object. In this case, the display device successively transmits information detected by the detectors to the server, and the server detects the operation to notify the display device of the detection results. Such a configuration as above enables to reduce the load on the display device.

One of the embodiments represents the example in which the display device includes four imaging units; however, the number and the arrangement of the imaging units provided in the display device are not limited to the example.

The other embodiment is configured that the display device includes the two housings, each of which includes a detector; however, the number of the housings provided in the display device is not limited to two. For example, a display device provided with one housing may include a plurality of detectors.

Figure 38:
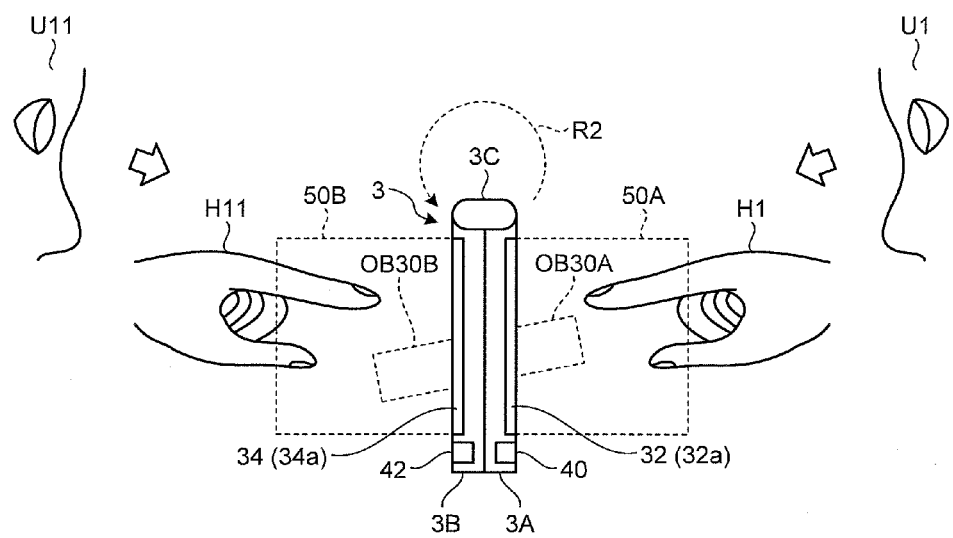
FIG. 38 is a diagram for explaining detection of an operation performed for the three-dimensional object according to a third embodiment.

Like a mobile phone 3 illustrated in FIG. 38, a hinge 3C (rotation axis) may be configured so that an angle R2 formed by the display unit 32a provided in a first housing 3A and the display unit 34a provided in a second housing 3B can be changed from 0° to 360°. In this case, for example, when the angle R2 is 0°, the display unit 32a and the display unit 34a face each other, and therefore the mobile phone 3 is appropriate for storage of the mobile phone 3. When the angle R2 is 360°, a three-dimensional space 50A formed by the display unit 32a and a three-dimensional space 50B formed by the display unit 34a are oppositely directed to each other. With this configuration, in the various games explained based on, for example, FIG. 8 to FIG. 10, a three-dimensional object OB30A displayed by the display unit 32a and a three-dimensional object OB30B displayed by the display unit 34a can be displayed as if they pass through the display units, thus enhancing the sense of realism in the games.

The advantages are that one embodiment of the invention provides a display device that can provide the user with convenient operations.

What is claimed is:

1. A display device comprising:
a first display unit for three-dimensionally displaying a first display object in a first space;
a second display unit for three-dimensionally displaying a second display object associated with the first display object in a second space;
a first detecting unit for detecting a move of a first object in the first space;
a second detecting unit for detecting a move of a second object in the second space; and
a control unit for changing the first display object and the second display object according to a first move of the first object in the first space.

2. The display device according to claim 1, wherein,
when the first move of the first object in the first space is detected by the first detecting unit and a second move of the second object in the second space is detected by the second detecting unit,
the control unit is configured to change the first display object and the second display object according to a first detected move of the first move and the second move.

3. The display device according to claim 2, wherein,
when a difference between a time at which the first move is detected and a time at which the second move is detected is smaller than a predetermined time,
the control unit is configured not to change the first display object and the second display object.

4. The display device according to claim 1, wherein
the first detecting unit is configured to detect a first state in which the first object moves from outside of the first display object to inside thereof, and
the control unit is configured to change, when the first state is detected, the first display object and the second display object according to the move of the first object.

5. The display device according to claim 1, wherein
the first detecting unit is configured to detect a second state in which the first object is located at a position in contact with the first display object for the longer period of time than the predetermined time, and
the control unit is configured to change, when the second state is detected, the first display object and the second display object according to the move of the first object.

6. The display device according to claim 1, wherein
the first detecting unit is configured to detect a third state in which the first object is continuously moved from outside of the first display object to inside thereof for the longer period of time than the predetermined time, and
the control unit is configured to change, when the third state is detected, the first display object and the second display object according to the move of the first object.

7. The display device according to claim 1, wherein
the first detecting unit is configured to detect a fourth state in which the first object is continuously moved from outside of the first display object to inside thereof for the longer period of time than the predetermined time, and
the control unit is configured to start changing the first display object and the second display object when it is detected that the first object is moved to the inside of the first display object.

8. The display device according to claim 7, wherein,
when the movement of the first object to the inside of the first display object becomes undetectable after the start of changing the first display object and before elapse of the predetermined time,
the control unit is configured to display a reverse change to return the changes of the first display object and the second display object to their original states.

9. The display device according to claim 1, wherein
the first detecting unit is configured to detect a fifth state in which the first display object is located between the first object and the second object, and
the control unit is configured to change, when the fifth state is detected, the first display object and the second display object.

10. The display device according to claim 1, wherein
the first detecting unit is configured to detect a sixth state in which the first display object is located between the first object and the second object for the longer period of time than the predetermined time, and
the control unit is configured to change, when the sixth state is detected, the first display object and the second display object.

11. The display device according to claim 1, wherein
the first detecting unit is configured to detect a seventh state in which the first display object is located between the first object and the second object and a distance between the first object and the second object is not increased for the longer period of time than the predetermined time, and
the control unit is configured to change, when the seventh state is detected, the first display object and the second display object.

12. The display device according to claim 1, wherein
the first detecting unit is configured to detect an eighth state in which the first display object is located between the first object and the second object, and thereafter at least one of the first object and the second object is moved and a distance between the first object and the second object is not increased for the longer period of time than the predetermined time, and
the control unit is configured to start changing the first display object and the second display object at a time of detecting the movement.

13. The display device according to claim 12, wherein,
when it is detected that the first display object is located between the first object and the second object, and thereafter at least one of the first object and the second object is moved and the distance between the first object and the second object is increased before elapse of the predetermined time,
the control unit is configured to display a reverse change to return the changes of the first display object and the second display object to their original states.

14. The display device according to claim 2, wherein
the control unit is configured to implement a seesaw game by changing the first display object and the second display object according to the first move and the second move.

15. The display device according to claim 2, wherein
the control unit is configured to implement a whack-a-mole game by changing the first display object and the second display object according to the first move and the second move.

16. The display device according to claim 1, wherein
the first detecting unit is configured to detect a move of the first object by detecting capacitance.

17. The display device according to claim 1, wherein
the first detecting unit is configured to detect a move of the first object by detecting either one of visible light and invisible light.

18. A display device comprising:
a first display unit for three-dimensionally displaying a first display object in a first space;
a second display unit for three-dimensionally displaying a second display object associated with the first display object in a second space;
a first detecting unit for detecting a move of a first object in the first space;
a second detecting unit for detecting a move of a second object in the second space; and
a control unit for changing the first display object and the second display object according to a first move of the first object in the first space, wherein
the first display unit and the second display unit are configured such that an angle therebetween can be changed substantially from 0° to 360°.

19. The display device according to claim 18, wherein,
when the angle is near 360°,
the first display unit and the second display unit are configured such that the first space and the second space are formed in opposite directions to each other.

* * * * *